United States Patent
Su et al.

(10) Patent No.: US 10,541,768 B2
(45) Date of Patent: Jan. 21, 2020

(54) MAC AND RRC MULTIPLEXING FOR INTER-RAT DUAL CONNECTIVITY UE

(71) Applicant: Apple Inc., Cupertino, CA (US)

(72) Inventors: Li Su, San Jose, CA (US); Haijing Hu, Beijing (CN); Dawei Zhang, Saratoga, CA (US); Wei Zeng, San Diego, CA (US); Yuchul Kim, Santa Clara, CA (US); Xiangying Yang, Cupertino, CA (US); Beibei Wang, Cupertino, CA (US); Zhu Ji, San Jose, CA (US); Yang Li, Plano, TX (US); Jia Tang, San Jose, CA (US); Sami M. Almalfouh, San Jose, CA (US); Johnson O. Sebeni, Fremont, CA (US); Wei Zhang, Santa Clara, CA (US); Tianyan Pu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 16/009,379

(22) Filed: Jun. 15, 2018

(65) Prior Publication Data

US 2018/0367230 A1   Dec. 20, 2018

Related U.S. Application Data

(60) Provisional application No. 62/520,272, filed on Jun. 15, 2017, provisional application No. 62/520,392, filed on Jun. 15, 2017.

(51) Int. Cl.
*H04J 1/08* (2006.01)
*H04W 76/16* (2018.01)
(Continued)

(52) U.S. Cl.
CPC ............... *H04J 1/08* (2013.01); *H04W 76/16* (2018.02); *H04W 76/28* (2018.02); *H04W 80/02* (2013.01); *H04W 80/04* (2013.01); *H04W 88/06* (2013.01)

(58) Field of Classification Search
None
See application file for complete search history.

(56) References Cited

U.S. PATENT DOCUMENTS 9,295,092 B2   3/2016 Kaur
2011/0243047 A1 * 10/2011 Dayal ................... H04W 16/14
                                                           370/311
(Continued)

FOREIGN PATENT DOCUMENTS

WO   WO-2018029493 A1 * 2/2018

*Primary Examiner* — Candal Elpenord
(74) *Attorney, Agent, or Firm* — Kowert Hood Munyon Rankin and Goetzel PC; Jeffrey C. Hood

(57) ABSTRACT

Apparatuses, systems, and methods for a wireless device to perform simultaneous uplink activity for multiple RATs in the same carrier using multiplexing at a layer above the physical layer. The wireless device may establish wireless links with first and second base stations, respectively, according to first and second radio access technologies (RATs), respectively. The first base station may provide a first cell operating in a first system bandwidth and the second base station may provide a second cell operating in a second system bandwidth. The wireless device may determine whether inter-RAT uplink coexistence in the same frequency band is enabled. If so, the wireless device may perform uplink activity for both the first RAT and the second RAT in the first system bandwidth by multiplexing uplink data for the first RAT and uplink data for the second RAT at a layer above the physical layer.

20 Claims, 17 Drawing Sheets

(51) Int. Cl.
*H04W 76/28* (2018.01)
*H04W 88/06* (2009.01)
*H04W 80/02* (2009.01)
*H04W 80/04* (2009.01)

(56) References Cited

U.S. PATENT DOCUMENTS

| | | | |
|---|---|---|---|
| 2013/0028069 A1* | 1/2013 | Pelletier | H04W 72/0453 |
| | | | 370/216 |
| 2013/0088983 A1* | 4/2013 | Pragada | H04W 16/14 |
| | | | 370/252 |
| 2013/0196654 A1 | 8/2013 | Wietfeldt | |
| 2015/0188650 A1 | 7/2015 | Au | |
| 2015/0256303 A1 | 9/2015 | Belghoul | |
| 2018/0124642 A1* | 5/2018 | Phuyal | H04W 28/08 |
| 2018/0316481 A1* | 11/2018 | Montojo | H04L 5/003 |

\* cited by examiner

MAC AND RRC MULTIPLEXING FOR INTER-RAT DUAL CONNECTIVITY UE

PRIORITY INFORMATION

This application claims priority to U.S. provisional patent application Ser. No. 62/520,272, entitled "MAC Multiplexing for Inter-RAT Dual Connectivity UE," filed Jun. 15, 2017, and to U.S. provisional patent application Ser. No. 62/520,392, entitled "RRC Multiplexing for Inter-RAT Dual Connectivity UE," filed Jun. 15, 2017, which are hereby incorporated by reference in their entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform attachment of a wireless device to concurrent (or substantially concurrent) connections with a next generation network node (e.g., a fifth generation new radio (5G NR) network node) and a legacy network node (e.g., an LTE network node).

According to some embodiments, a wireless device may include a first radio in communication with a first antenna and a second radio in communication with a second antenna. The first radio may be configured to perform cellular communication according to a first radio access technology (RAT) and the second radio may be configured to perform cellular communication according to a second RAT.

According to some embodiments, the wireless device may utilize MAC, RRC, and/or other higher-than-physical layer multiplexing techniques to support simultaneous inter-RAT dual uplink connectivity on the same frequency carrier.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
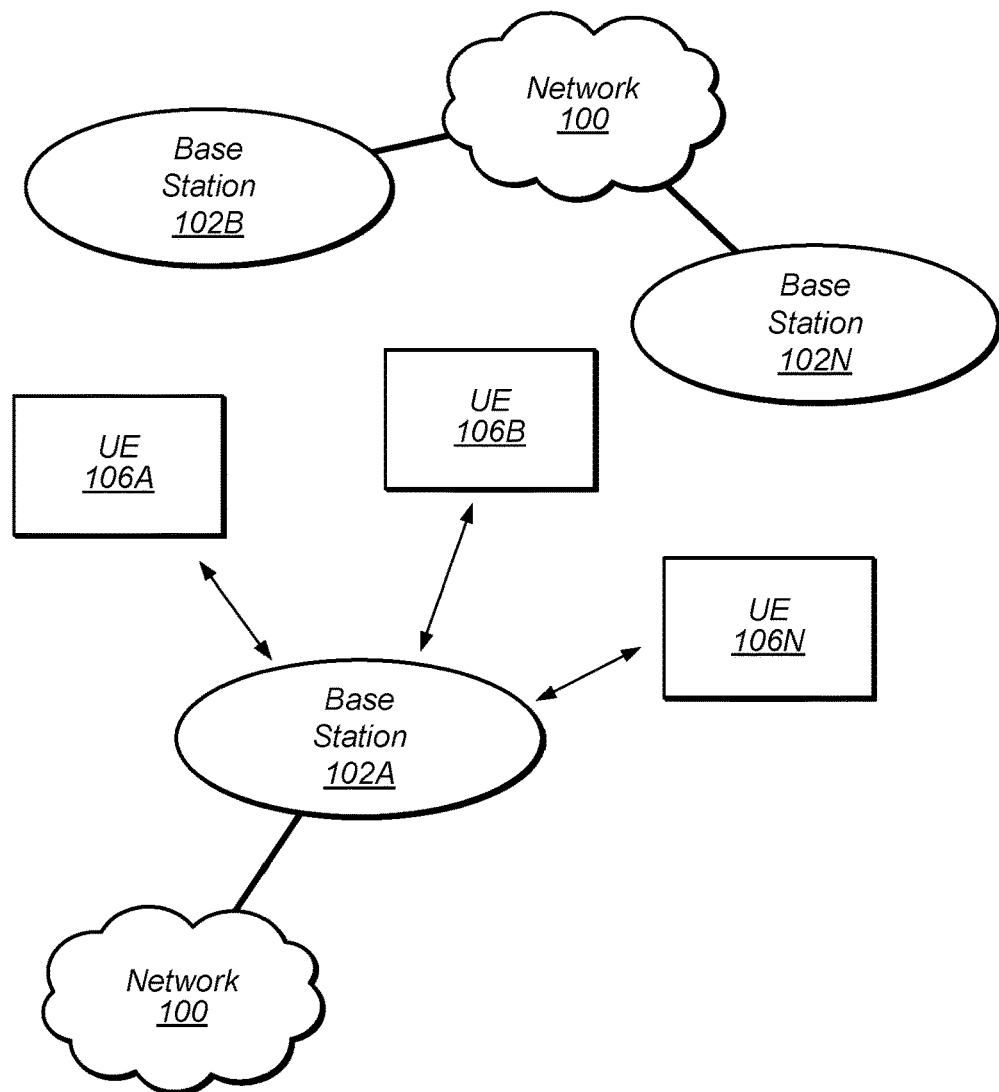
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
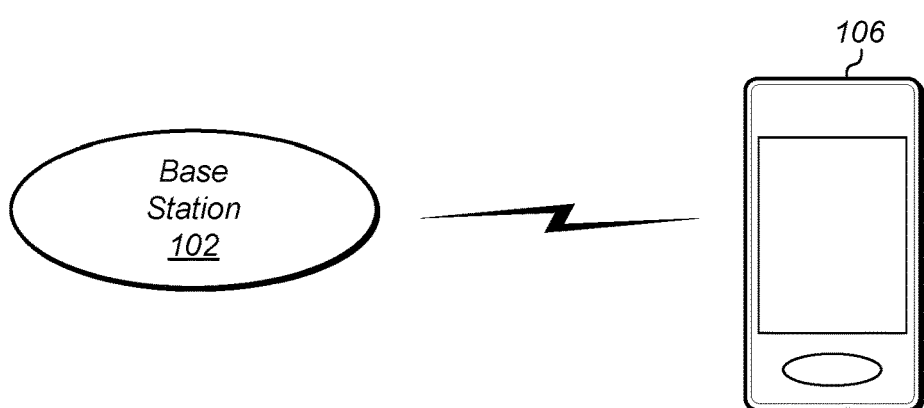
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
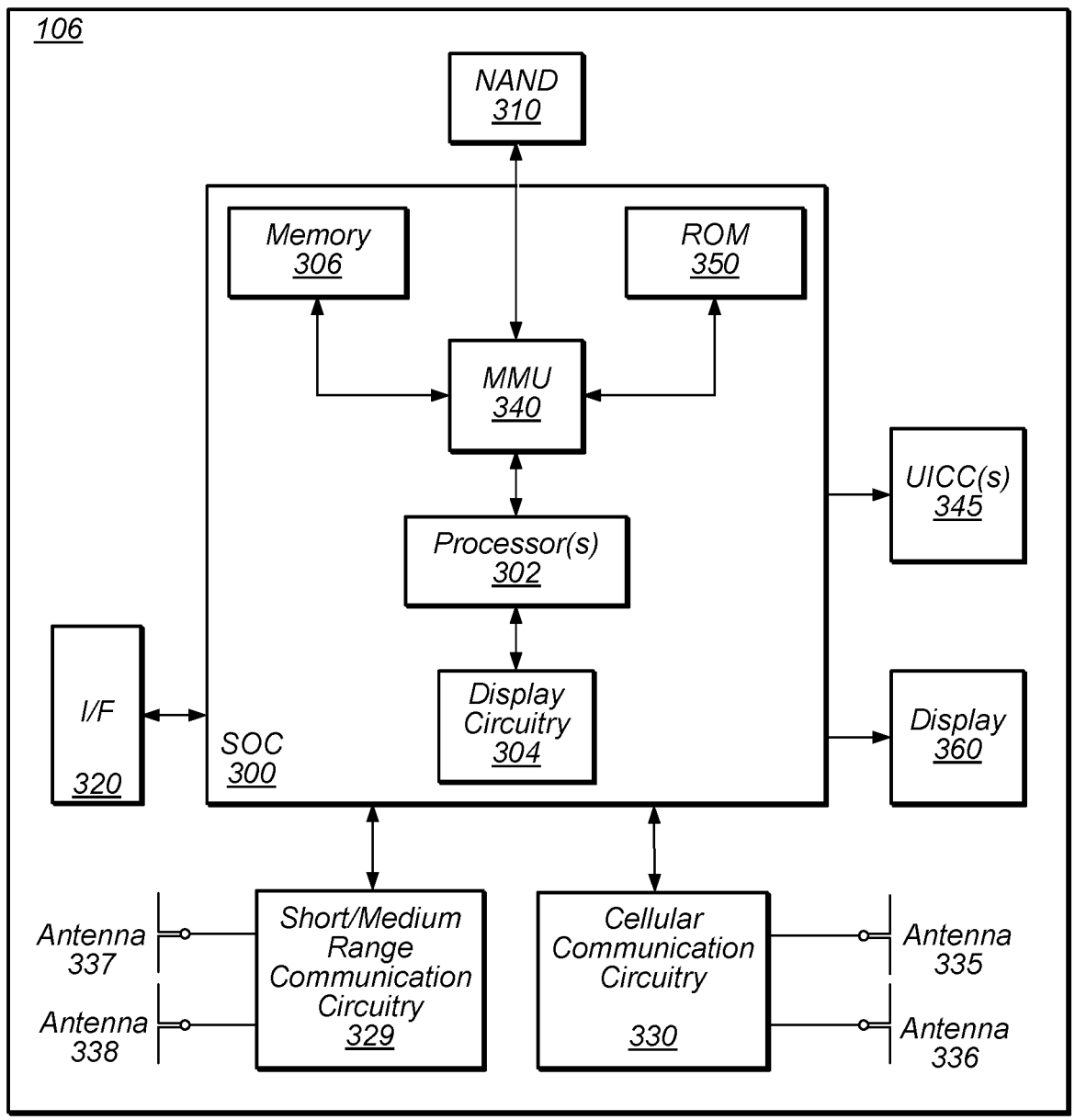
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a wearable device, a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (e.g., including and/or communicatively coupled to dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT (e.g., LTE), and may be in communication with a dedicated receive chain and a transmit chain shared with an additional radio, e.g., a second radio that may be dedicated to a second RAT (e.g., 5G NR), and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for using MAC multiplexing, RRC multiplexing, and/or otherwise higher-than-physical layer multiplexing to perform transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
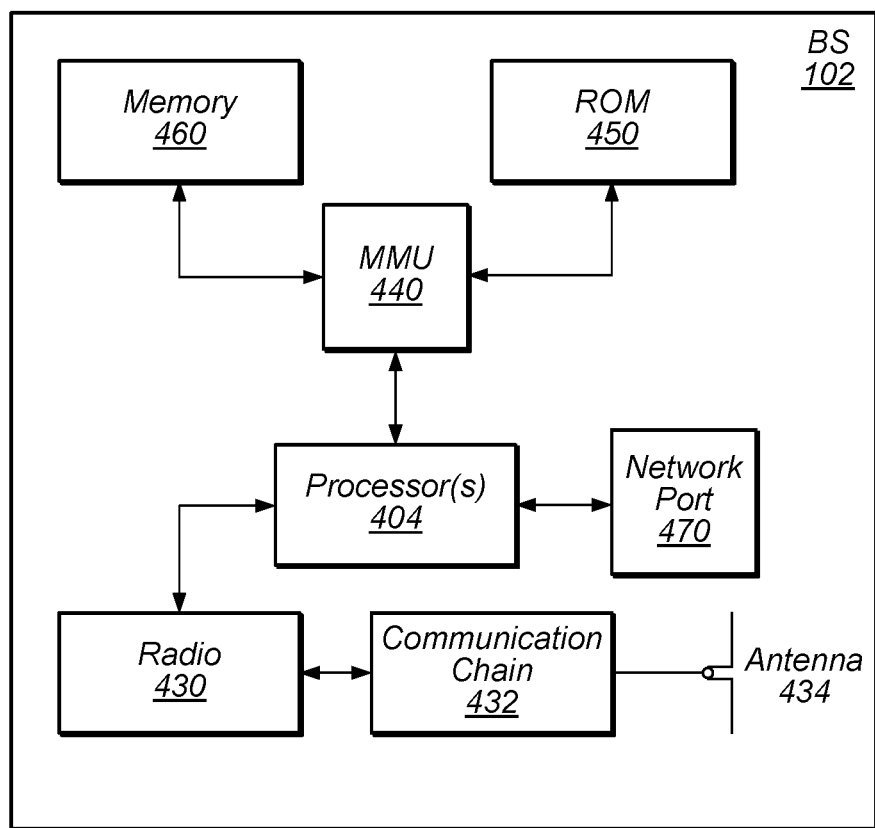
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
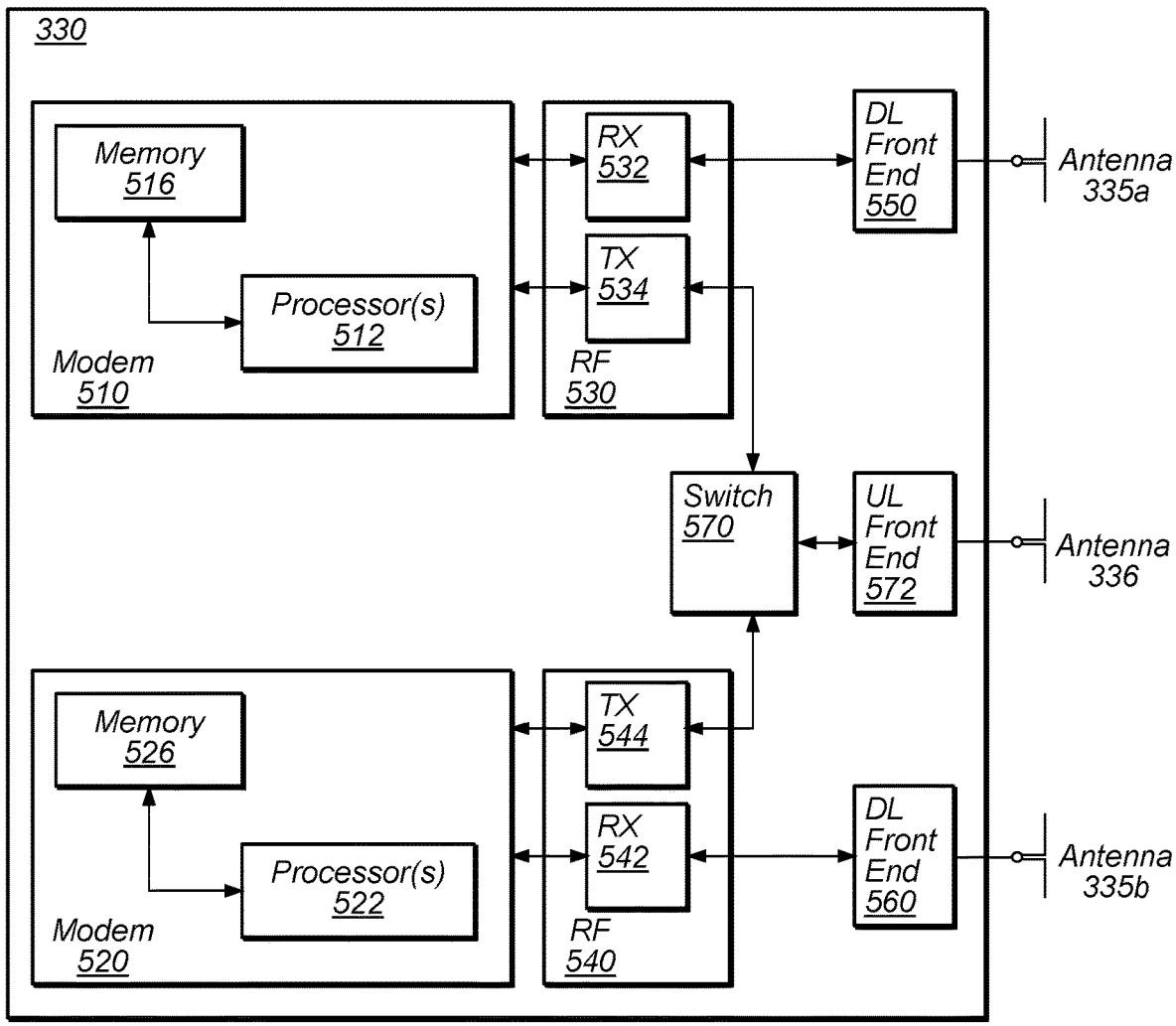
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a wearable device, a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using MAC multiplexing, RRC multiplexing, and/or otherwise higher-than-physical layer multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using MAC multiplexing, RRC multiplexing, and/or otherwise higher-than-physical layer multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

FIGS. 6-7—5G NR Non-standalone Architecture with LTE

Figure 6A:
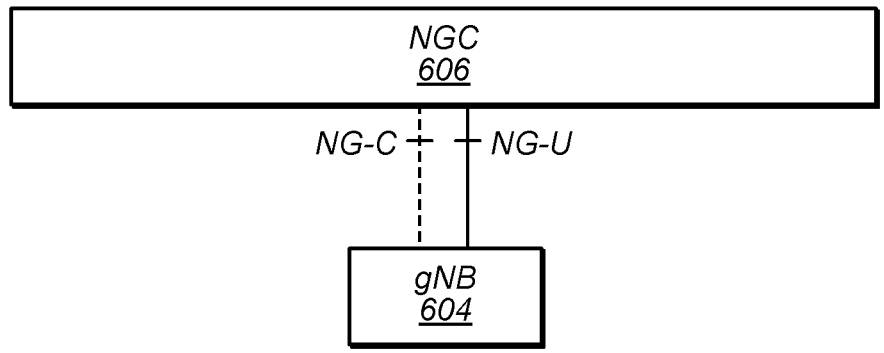
FIGS. 6A-6G illustrate examples of possible connections between an EPC network or a NGC network with an LTE base station (eNB) and a 5G NR base station (gNB), according to some embodiments.
Figure 6B:
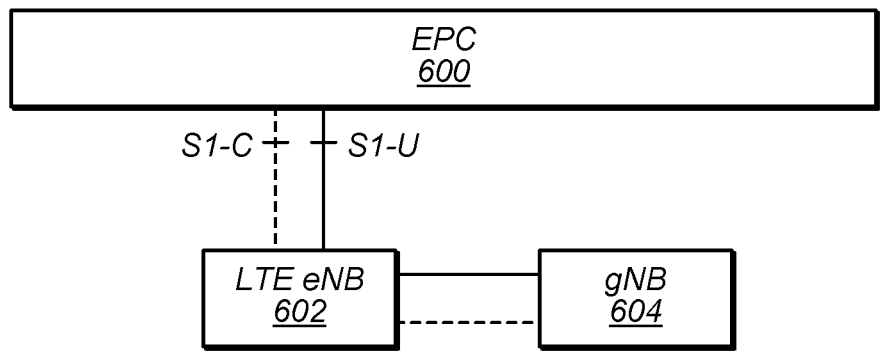
Figure 6C:
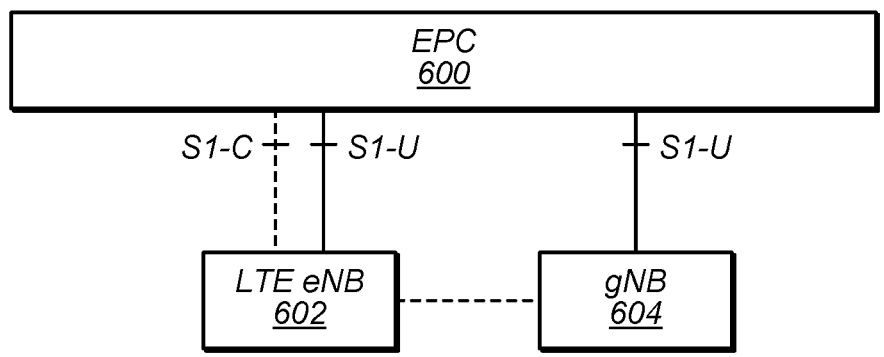

In some implementations, fifth generation (5G) wireless communication will initially be deployed concurrently with current wireless communication standards (e.g., LTE). For example, whereas FIG. 6A illustrates a possible standalone (SA) implementation of a next generation core (NGC) network 606 and 5G NR base station (e.g., gNB 604), dual connectivity between LTE and 5G new radio (5G NR or NR), such as in accordance with one or more of the exemplary non-standalone (NSA) architectures illustrated in FIGS. 6B-6G, has been specified as part of the initial deployment of NR. Thus, as illustrated in FIGS. 6B-6C, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances (e.g., as in FIG. 6C), the gNB 604 may also have at least a user plane reference point with EPC network 600.

Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

As further illustrated in FIGS. 6D-6G, additional NSA architectures in which a NGC network 606 has a control plane reference point with a gNB 604, which may in turn pass data between the NGC network 600 and a eLTE eNB 602 (e.g., as in FIGS. 6D-6E), and/or in which a NGC network 606 has a control plane reference point with a eLTE eNB 602, which may in turn pass data between the NGC network 600 and gNB 604 (e.g., as in FIGS. 6F-6G), are also possible.

Figure 7A:
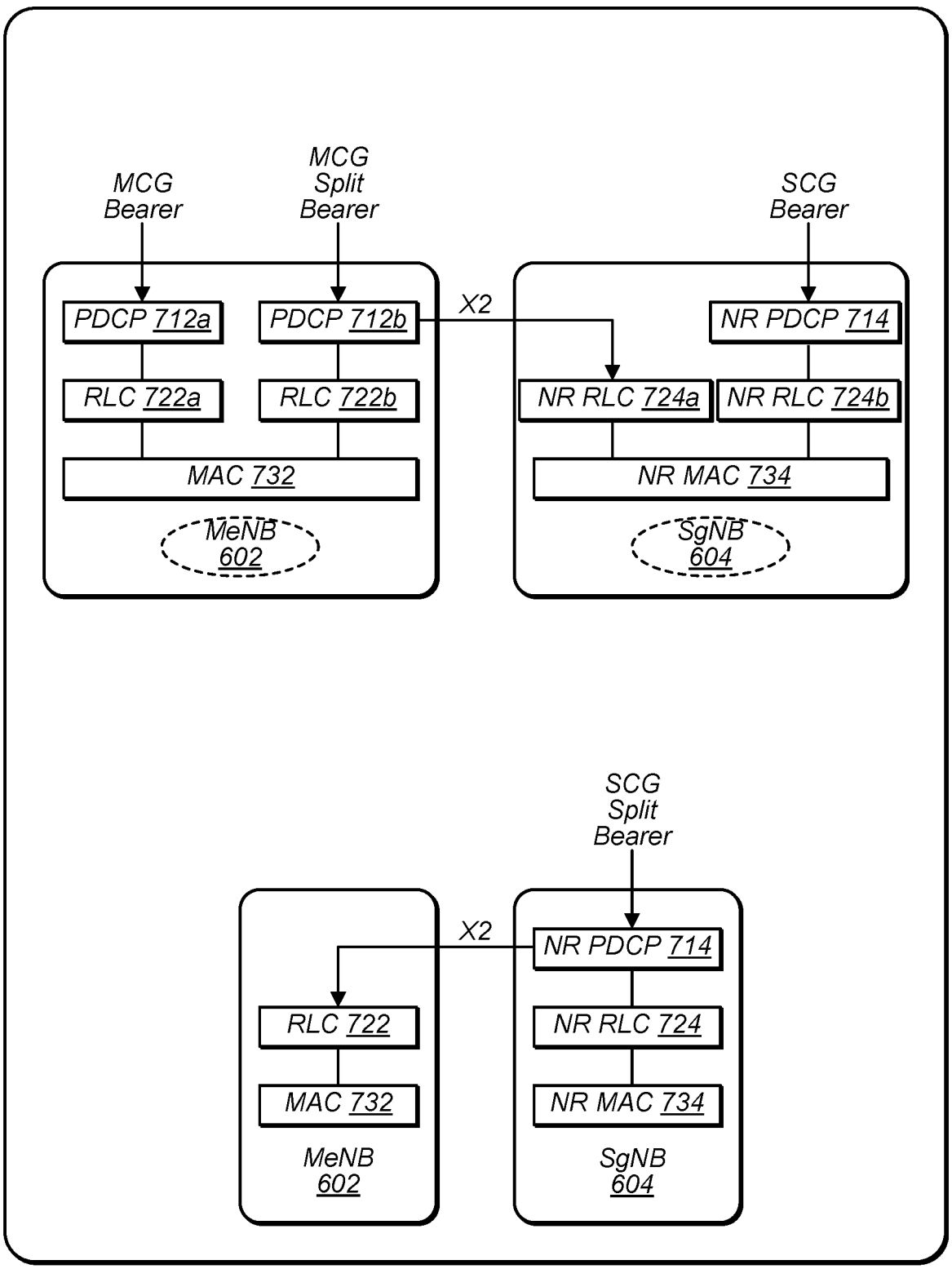
FIGS. 7A-7B illustrate examples of possible protocol stacks for an eNB and a gNB, according to some embodiments.

FIG. 7A illustrates a proposed protocol stack for eNB 602 and gNB 604, e.g., that may be used in conjunction with one or both of the architectures of FIGS. 6B-6C, according to some embodiments. As shown, eNB 602 may include a medium access control (MAC) layer 732 that interfaces with radio link control (RLC) layers 722*a*-*b*. RLC layer 722*a* may also interface with packet data convergence protocol (PDCP) layer 712*a* and RLC layer 722*b* may interface with PDCP layer 712*b*. Similar to dual connectivity as specified in LTE-Advanced Release 12, PDCP layer 712*a* may interface via a master cell group (MCG) bearer to EPC network 600 whereas PDCP layer 712*b* may interface via a MCG split bearer with EPC network 600.

Additionally, as shown, gNB 604 may include a MAC layer 734 that interfaces with RLC layers 724*a*-*b*. RLC layer 724*a* may interface with PDCP layer 712*b* of eNB 602 via an $X_2$ interface for information exchange and/or coordination (e.g., scheduling of a UE) between eNB 602 and gNB 604. In addition, RLC layer 724*b* may interface with PDCP layer 714. Similar to dual connectivity as specified in LTE-Advanced Release 12, PDCP layer 614 may interface with EPC network 600 via a secondary cell group (SCG) bearer. As further shown in the bottom portion of FIG. 7A, the PDCP layer 714 may interface via a SGC split bearer to EPC 600, and may in turn interface with RLC layer 722 and NR RLC layer 724, which may in turn respectively interface with MAC layer 732 and NR MAC layer 734. Thus, eNB 602 may be considered a master node (MeNB) while gNB 604 may be considered a secondary node (SgNB). In some scenarios, a UE may need to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 6D:
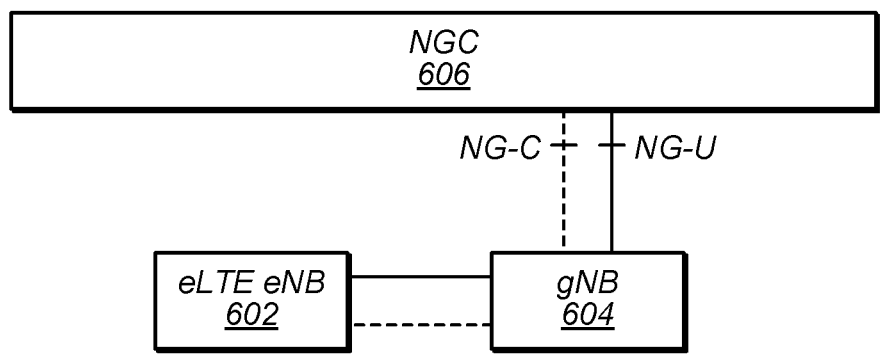
Figure 6E:
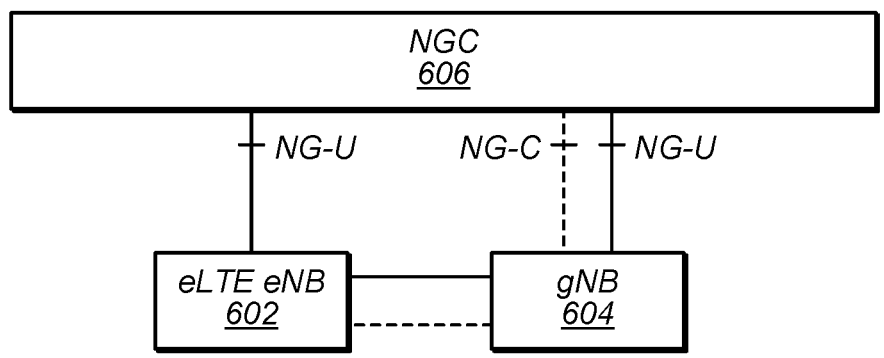
Figure 6F:
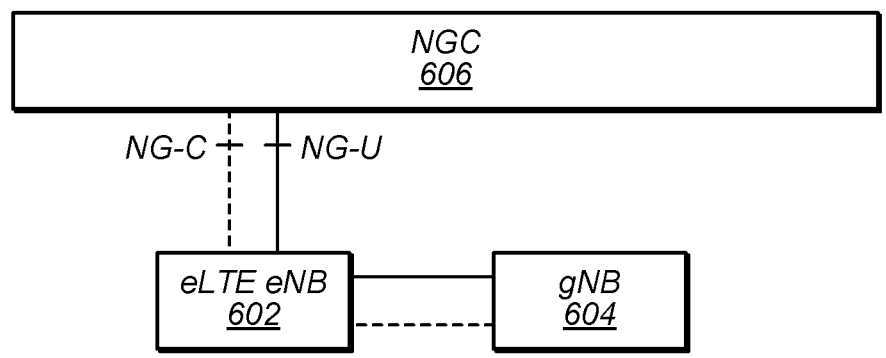
Figure 6G:
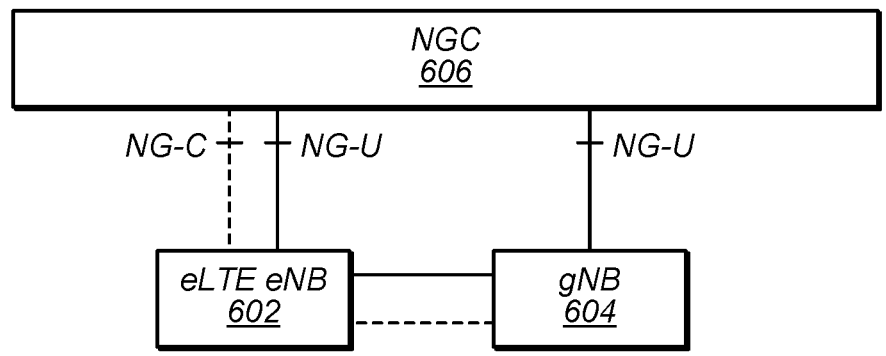
Figure 7B:
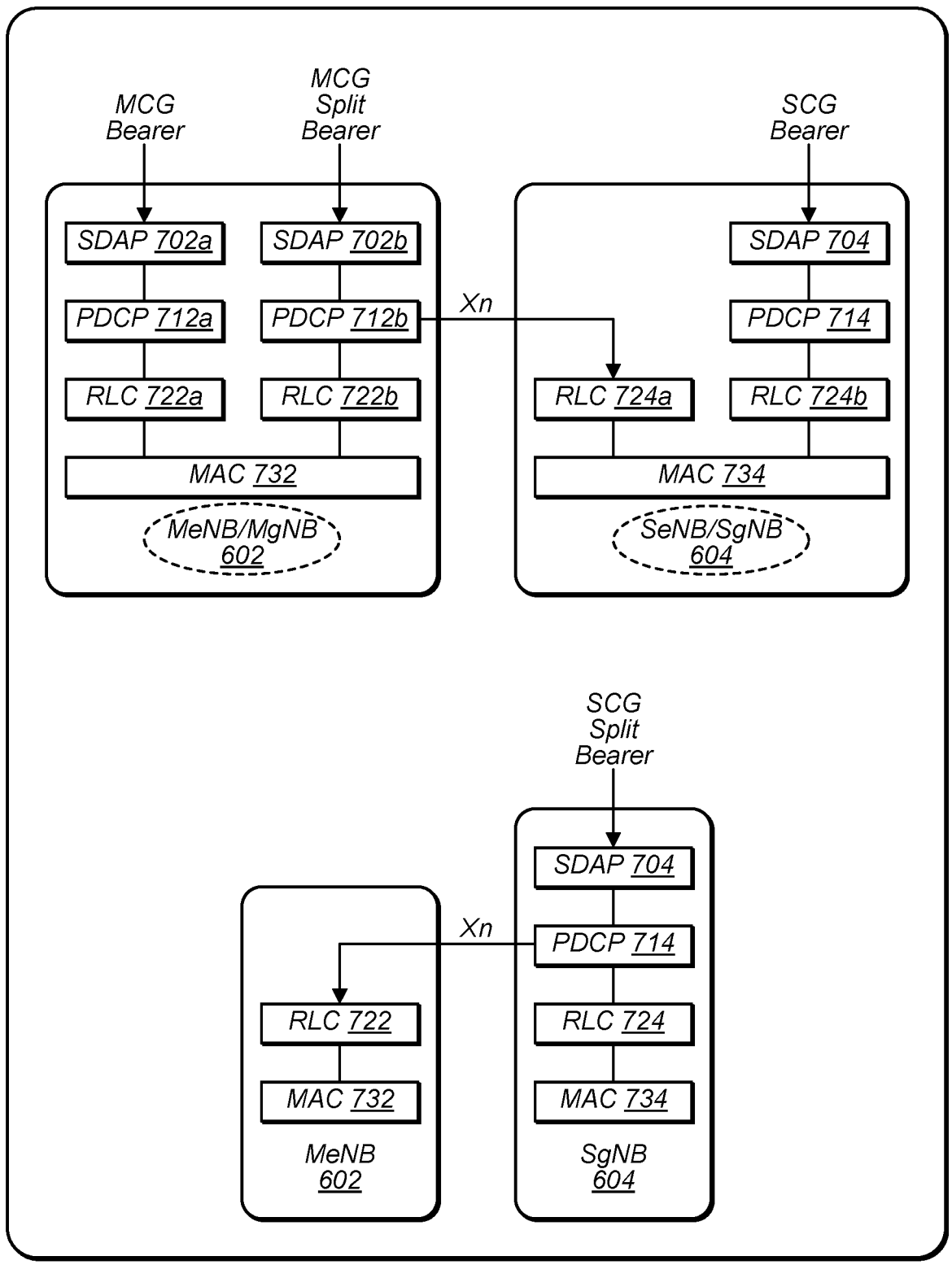

FIG. 7B illustrates another proposed protocol stack for eNB 602 and gNB 604, e.g., that may be used in conjunction with one or more of the architectures of FIGS. 6D-6F, according to some embodiments. As shown, a master eNB/gNB 602 (e.g., depending on the network architecture) may include a medium access control (MAC) layer 732 that interfaces with radio link control (RLC) layers 722*a*-*b*. RLC layer 722*a* may also interface with packet data convergence protocol (PDCP) layer 712*a* and RLC layer 722*b* may interface with PDCP layer 712*b*. PDCP layer 712*a* may also interface with service data adaptation protocol (SDAP) layer 702*a* and PDCP layer 712*b* may interface with SDAP layer 702*b*. SDAP layer 702*a* may interface via a master cell group (MCG) bearer to NGC network 606 whereas SDAP layer 702*b* may interface via a MCG split bearer with NGC network 606.

Additionally, as shown, secondary eNB/gNB 604 may include a MAC layer 734 that interfaces with RLC layers 724*a-b*. RLC layer 724*a* may interface with PDCP layer 712*b* of eNB/gNB 604 via an $X_2$ interface for information exchange and/or coordination (e.g., scheduling of a UE) between eNB/gNB 602 and eNB/gNB 604. In addition, RLC layer 724*b* may interface with PDCP layer 714, which may in turn interface with SDAP layer 704. SDAP layer 704 may interface with NGC network 606 via a secondary cell group (SCG) bearer. As further shown in the bottom portion of FIG. 7B, the SDAP layer 704 may interface via a SGC split bearer to NGC 606, and may in turn interface with PDCP layer 712, which may in turn interface with RLC layer 722 and RLC layer 724, which may in turn respectively interface with MAC layer 732 and MAC layer 734. In some scenarios, a UE may need to maintain a connection to both a master node and a secondary node. In at least some such scenarios, the master node may be used to maintain a radio resource control (RRC) connection to an EPC/NGC while the secondary node may be used for capacity (e.g., additional downlink and/or uplink throughput).

In general, a non-stand alone (NSA) implementation employs dual connectivity in both uplink (UL) and downlink (DL). In other words, dual connectivity may employ two active radio links in both UL and DL. In some implementations, depending on frequency band combinations, two (substantially) concurrent UL connections may cause receiver sensitivity degradation at the UE. For example, in some proposed implementations, a UE may need to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize receiving for LTE DL band 7.

In addition, future specifications of NR NSA may require a UE to support co-existence of LTE UL and NR UL within the bandwidth of an LTE component carrier and co-existence of LTE DL and NR DL within the bandwidth of an LTE component carrier. Further, such an implementation may reduce impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Embodiments described herein define systems, methods, and mechanisms for a UE to support 5G NSA operation.

Figure 8:
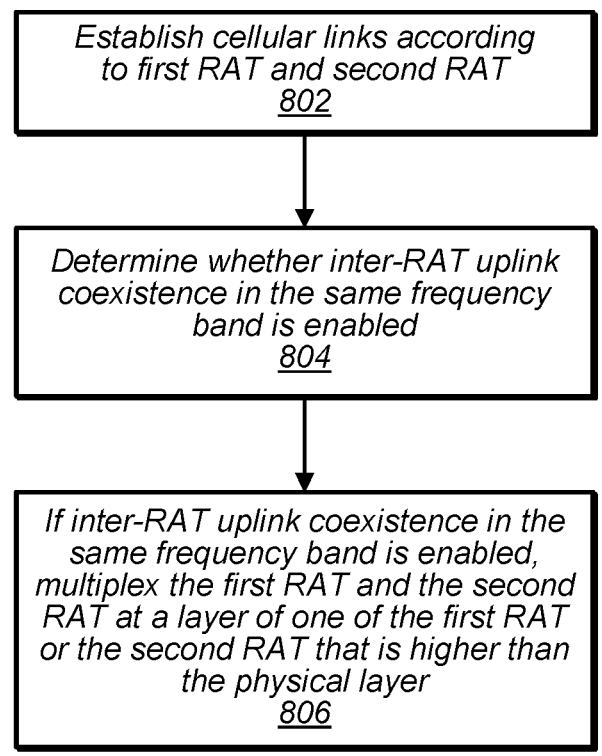
FIG. 8 illustrates a block diagram of an example of a method for using RRC multiplexing to support inter-RAT dual uplink connectivity in the same carrier frequency, according to some embodiments.

FIG. 8—Higher Layer Multiplexing for Inter-RAT Dual Connectivity

As one possible choice for supporting dual connectivity for concurrent LTE UL and NR UL activities on the same carrier frequency, MAC layer multiplexing techniques may be used by a wireless device. As another possible choice, RRC layer multiplexing techniques may be used. Accordingly, FIG. 8 is a flowchart diagram illustrating an example method for a wireless device to use MAC, RRC, and/or otherwise higher-than-physical layer multiplexing to transmit in the same carrier frequency for inter-RAT dual connectivity. Aspects of the method of FIG. 8 may be implemented by a wireless device such as a UE 106 illustrated in various of the Figures herein, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional elements may also be performed as desired. As shown, the method may operate as follows.

At 802, the wireless device may establish cellular links according to a first RAT and a second RAT. This may include attaching to a first base station that operates according to the first RAT, which may provide a first cell operating in a first system bandwidth (e.g., including a first carrier frequency). This may further include attaching to a second base station that operates according to the second RAT, which may provide a second cell operating in a second system bandwidth (e.g., including a second carrier frequency), which may be different than (e.g., non-overlapping with) the first system bandwidth. Note that the first base station and the second base station may be different physical base stations or may be provided by the same physical base station and may differ only logically (e.g., a base station may be capable of providing cells according to both the first RAT and the second RAT).

In some embodiments, one of the RATs may be LTE and the other RAT may be NR; for example, the first RAT may be NR and the second RAT may be LTE. The order in which the cellular links are established may be arbitrary or may depend on any of various considerations, potentially including network architecture (e.g., if one of the base stations is intended for NSA operation and/or is a secondary base station), relative signal strength, relative priority level, etc. As one possibility, the wireless device may initially transmit signaling to an LTE base station, such as eNB 602 described previously herein, to establish an attachment to an LTE network. In other words, the wireless device may request a connection with the LTE base station.

In some embodiments, prior to transmitting the message, the wireless device may couple (e.g., via a switch) an uplink antenna to a transmit chain dedicated to LTE uplink transmissions, e.g., as described above in reference to FIG. 5. Alternatively, at least according to some embodiments, the wireless device may include sufficient uplink antennas that LTE and 5G NR uplink activities can be performed concurrently using separate antennas.

Continuing with the preceding example, in some instances the wireless device may transmit signaling to a 5G NR base station, such as gNB 604 described previously herein, to establish an attachment to a 5G NR network. In other words, the wireless device may request a connection with the 5G NR base station. In some embodiments, prior to transmitting the signaling, the wireless device may couple (e.g., via a switch) an uplink antenna to a transmit chain dedicated to 5G NR uplink transmissions, e.g., as described above in reference to FIG. 5. Alternatively, as previously noted, the wireless device may include sufficient uplink antennas that LTE and 5G NR uplink activities can be performed concurrently using separate antennas.

In some instances, the wireless device may receive an indication (e.g., from the LTE base station) that dual connectivity has been established. In other words, the wireless device may receive a message including one or more bits indicating that a connection with both the LTE base station and the 5G NR base station has been established. In some embodiments, the UE may receive the indication via a downlink antenna coupled to a receive chain dedicated to receiving LTE downlink transmissions, e.g., as described above in reference to FIG. 5.

In 804, the wireless device may determine whether inter-RAT uplink coexistence in the same frequency band is enabled. According to some embodiments, such uplink coexistence may be enabled by a LTE eNB based on any of a variety of possible considerations, potentially including any or all of UE and eNB configuration/capabilities, network configuration, cell signal strength/quality and/or other measurement report results, and/or whether independent multi-RAT uplink operation would generate any intermodulation products that might interfere with or cause desensing to receive operations of the UE, among various other possible considerations.

In some instances, the wireless device may additionally or alternatively determine whether one or both of the first RAT and the second RAT are scheduled to transmit at a given time (e.g., in the same subframe or slot, or otherwise in a temporally overlapping manner). The determination may be based on semi-static and/or dynamic scheduling indications from the first base station and/or the second base station. For example, in some instances, 5G NR operation may include time division duplexing between downlink and uplink slots, and indications may be provided of which slots are downlink slots and which slots are uplink slots. In LTE operation, certain resources may be semi-statically configured for control signaling. For example, certain resources may be set aside in an LTE uplink carrier for a LTE physical uplink control channel (PUCCH), a physical random access channel (PRACH), and/or sounding reference signals (SRS), according to some embodiments. Additionally, certain resources may be provided (e.g., dynamicaly scheduled by providing an uplink grant via downlink control information) for data communication, according to some embodiments.

Thus, as one possibility, the wireless device may receive an uplink scheduling grant for a first subframe for the first RAT, and may also receive an uplink scheduling grant for the first subframe for the second RAT, and may determine that the wireless device has uplink activity scheduled according to both the first RAT and the second RAT based on receiving the uplink scheduling grant for the first subframe for the first RAT and receiving the uplink scheduling grant for the first subframe for the second RAT. Alternatively, determination whether the wireless device has uplink activity scheduled according to both the first RAT and the second RAT may be performed by the network (e.g., by a master node of a gNB and a eNB, in some instances) and the wireless device may simply be scheduled for uplink activity on only one or the other RAT, or on both RATs, in accordance with uplink allocations provided by the network.

If uplink activity is scheduled according to only one or the other RAT, the uplink activity may be performed in the system bandwidth (e.g., on an uplink carrier frequency) associated with that RAT. Thus, the wireless device might perform uplink activity for the first RAT in the first system bandwidth if uplink activity is scheduled according to only the first RAT, and might perform uplink activity for the second RAT in the second system bandwidth if uplink activity is scheduled according to only the second RAT.

However, if uplink activity is scheduled according to both first RAT and second RAT, or possibly in general if inter-RAT uplink coexistence in the same frequency band is enabled, in 806, the wireless device may perform uplink activity for the first RAT and the second RAT on the same carrier frequency by multiplexing the uplink activity for the first RAT and the second RAT at a layer above the physical layer.

As one possibility, this may include providing the uplink data for the second RAT from a radio link control (RLC) layer of the second RAT to the MAC layer of the first RAT. The services of the first RAT, including physical layer handling and transmission, may thus be used for both the first RAT and the second RAT, and the multplexed uplink data for the first RAT and the second RAT may be transmitted using a physical layer waveform in accordance with the first RAT on an uplink carrier frequency associated with the first RAT.

At least according to some embodiments, a mapping or routing mechanism may be provided for indicating which uplink data multiplexed at the MAC layer of the first RAT is associated with which RAT. For example, different UL logical channels, TAGs for identifying MAC entity in NR, MAC IDs, or other mechanisms may be used to indicate that the uplink data for the first RAT is associated with the first RAT, and to indicate that the uplink data for the second RAT is associated with the second RAT, after the uplink data for the first RAT and the uplink data for the second RAT are multiplexed at the MAC layer of the first RAT.

In some instances, the MAC layer of the first RAT may perform logical channel handling for the multiplexed uplink data. This may include serving logical channels with equal priority equally regardless of the RLC entity associated with a logical channel (e.g., which may result in equally prioritizing logical channels for the first RAT and the second RAT that have equal priority at the MAC layer of the first RAT), or serving logical channels with equal priority differently depending on the RLC entity associated with a logical channel (e.g., which may result in prioritizing logical channels for the first RAT more highly than logical channels associated with the second RAT even if they are otherwise configured with equal priority at the MAC layer of the first RAT, or vice versa).

As another possibility for multiplexing the uplink activity for the first RAT and the second RAT at a layer above the physical layer, uplink data for the second RAT may be provided from a radio link control (RRC) layer of the second RAT to the PDCP layer of the first RAT. The services of the first RAT, including PDCP, RLC, MAC, and PHY handling and transmission, may thus be used for both the first RAT and the second RAT, and the multplexed uplink data for the first RAT and the second RAT may be transmitted using a physical layer waveform in accordance with the first RAT on an uplink carrier frequency associated with the first RAT.

Multiplexing the RRC uplink data for the first RAT and the second RAT at the PDCP layer of the first RAT may include creating PDCP, RLC, and MAC entities for a signaling radio bearer (SRB) associated with the second RAT, according to some embodiments. The SRB associated with the second RAT may be mapped to the first RAT PDCP layer from a RRC entity associated with the second RAT, and may be multiplexed with a SRB associated with the first RAT (e.g., from a RRC entity associated with the first RAT) and/or a data radio bearer (DRB) associated with the first RAT (e.g., from a SDAP entity associated with the first RAT).

Note that, at least according to some embodiments, downlink operation may remain independent for the first RAT and the second RAT even when inter-RAT uplink coexistence in the same frequency band is enabled. Thus, the wireless device may receive communications according to the first RAT in a downlink frequency carrier for the first RAT, and may concurrently receive communications according to the second RAT in a downlink frequency carrier for the second RAT, at least in some instances.

For example, downlink signaling messages (such as RRC, NAS, etc.) and downlink data traffic according to the second RAT can still be transmitted to the wireless device on a downlink frequency carrier of the second RAT, which may be independently received by the wireless device in parallel with downlink signaling messages (such as RRC, NAS, etc.) and/or downlink data traffic according to the first RAT.

Accordingly, for the signaling and/or data of the second RAT (e.g., in RLC acknowledged mode), the RLC status report (RLC ACK/NACK) for the signaling and/or data may be generated by second RAT circuitry (e.g., at the RLC layer of the second RAT), but may be transmitted on a carrier frequency of the first RAT by the MAC/L2 and PHY/L1 layers of the first RAT, e.g., as RLC status reports for the signaling and/or data of the second RAT, along with RLC status reports for the signaling and/or data of the first RAT. The first base station may then pass the received RLC status reports for signaling and/or data of the second RAT to the second base station, e.g., for further processing.

In addition to uplink data of the second RAT that may be multiplexed with uplink data of the first RAT at the MAC or RRC layer of the first RAT, at least in some instances physical layer control signaling generated at the physical layer of the second RAT may also be provided to the physical layer of the first RAT, e.g., to be multiplexed with uplink control and/or data signaling for the first RAT and transmitted using a waveform in accordance with the first RAT. Such physical layer control signaling generated at the physical layer of the second RAT may include various types of control signaling generated in response to downlink communications according to the second RAT, such as ACK/NACK indications generated in response to downlink data received according to the second RAT, channel state information (CSI) (e.g., potentially including periodic and/or aperiodic CSI) generated in response to CSR report requests, and/or any of various other types of physical layer control information that might otherwise be generated and transmitted without any higher layer (e.g., MAC, RLC, etc.) handling at the wireless device. Such uplink control information may be transmitted using a physical layer data channel according to the first RAT, or a physical layer control channel according to the first RAT. Which channel is used may be statically or dynamically determined, e.g., based on network configuration, channel availability, and/or any of various other considerations, as desired.

Alternatively, according to some embodiments, physical layer control signaling generated at the physical layer of the second RAT may be transmitted in accordance with the second RAT, but using the system frequency for the first RAT, e.g., possibly in a frequency division multiplexing manner. Such a hybrid approach (e.g., MAC/RRC multiplexing for higher layer data, frequency division multiplexing for physical layer control information) may allow for time critical control information to be sent separately and thus potentially to be received by the corresponding network node(s) in a more timely manner.

FIGS. 9-19

FIGS. 9-19 and the information provided herein below in conjunction therewith are provided by way of example of various considerations and details relating to possible systems in which the method of FIG. 8 and/or other aspects of this disclosure may be implemented, and are not intended to be limiting to the disclosure as a whole. Numerous variations and alternatives to the details provided herein below are possible and should be considered within the scope of the disclosure.

Figure 9:
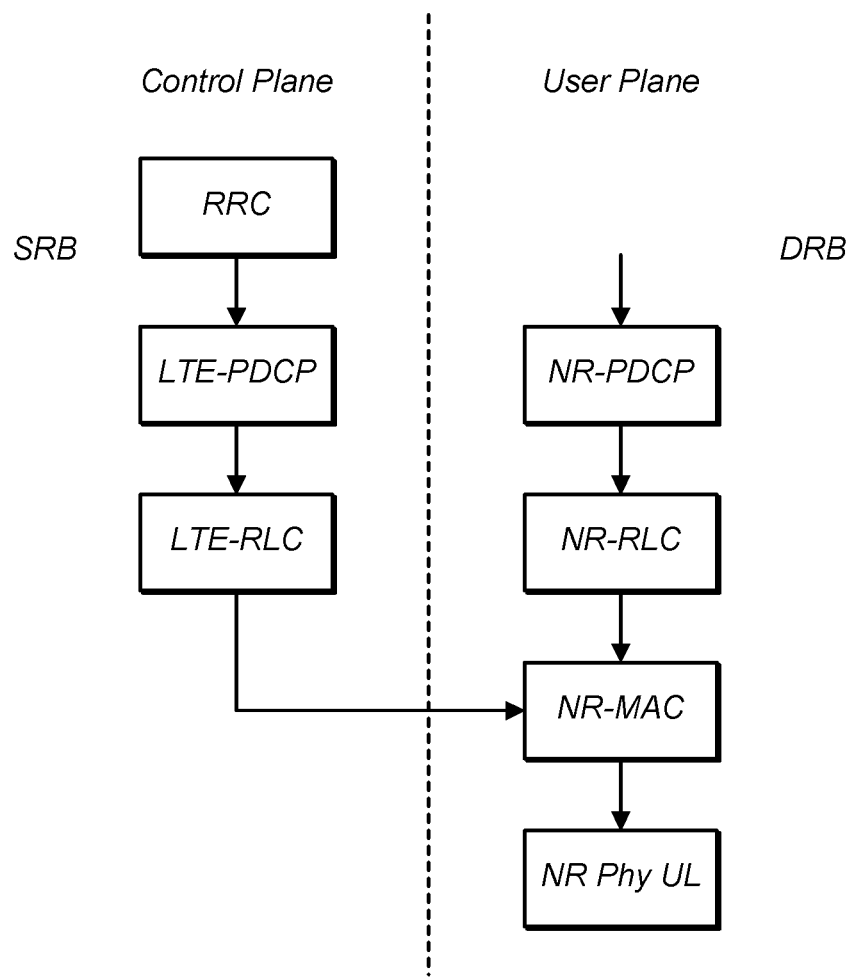
FIG. 9 illustrates an example of possible protocol stacks for a wireless device that implements MAC multiplexing to support inter-RAT dual uplink connectivity in the same carrier frequency, according to some embodiments.

FIG. 9 illustrates an example of possible protocol stacks for a wireless device that implements MAC multiplexing to support inter-RAT dual uplink connectivity in the same carrier frequency, according to some embodiments. As shown, the wireless device may include a control plane protocol stack that may utilize LTE, including RRC, LTE-PDCP, and LTE-RLC layers. The wireless device may also include a user plane protocol stack that may utilize NR, including NR-PDCP, NR-RLC, NR-MAC, and NR PHY UL layers.

The two RLC streams from NR and LTE respectively may be converged at the NR MAC layer, such that the NR MAC layer may effectively provide one joint MAC layer for both LTE PHY and NR PHY/each MAC entity may be associated with two acknowledged mode (AM) RLC entities. The joint MAC protocol may apply to both the control plane and the user plane for LTE-NR NSA operation. Thus, for LTE-NR NSA operation, the normal NR Uu protocol stack may be used for dual connection operation; for NR SA operation, the normal NR Uu protocol stack may be used.

When in UL coexistence operation, the LTE RLC may use the services provided by the NR MAC; in other cases, the LTE RLC may use the services provided by the LTE MAC. A routing or mapping mechanism may be defined between RLC and MAC, e.g., to facilitate distinguishing to which MAC the LTE RLC should route data, and/or to facilitate distinguishing which information/signaling multiplexed at the NR MAC is associated with the LTE RLC and which is associated with the NR RLC. The UL routing/mapping mechanism(s) could include any or all of special/new UL logical channels, one or more tags to identify the MAC entity in NR, a MAC ID, and/or other mechanisms that can achieve such a routing/mapping function.

Additionally, when in UL coexistence operation, the UE side MAC may need to be able to handle UL logical channel prioritization (LCP) for the multiplexed logical channels from the two RLC entities. As one possibility, on top of the LCP handling for normal NR, logical channels with equal priority may be served equally, e.g., no matter for which RLC entities those logical channels are served. As another possibility, on top of the LCP handling for normal NR, for logical channels configured with equal priority, logical channels for the NR RLC entity may be given higher priority.

Figure 10:
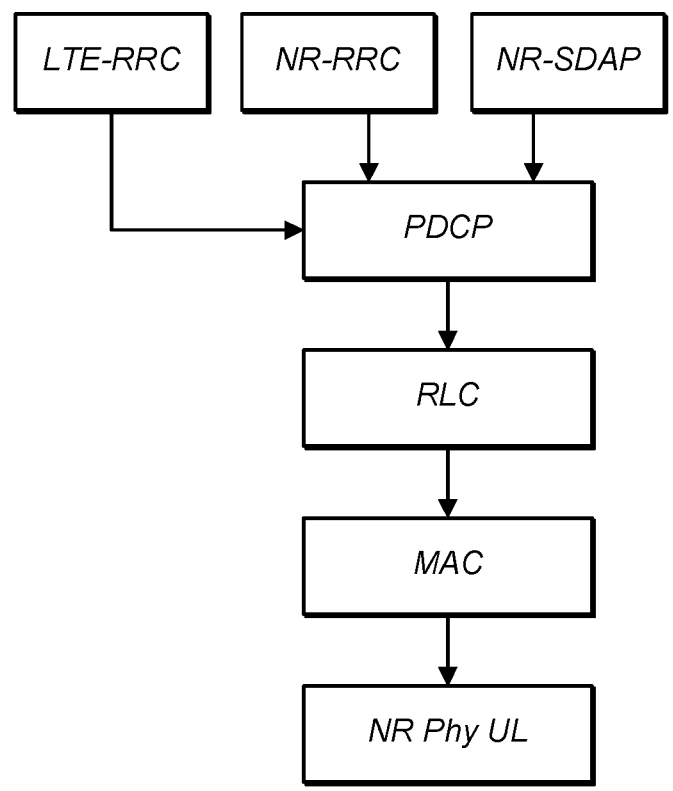
FIG. 10 illustrates an example of possible protocol stacks for a wireless device that implements RRC multiplexing to support inter-RAT dual uplink connectivity in the same carrier frequency, according to some embodiments.

FIG. 10 illustrates an example of possible protocol stack portions for a wireless device that implements RRC multiplexing to support inter-RAT dual uplink connectivity in the same carrier frequency, according to some embodiments. As shown, the wireless device may include LTE-RRC, NR-RRC, and NR-SDAP layers, all of which may interface with NR-PDCP, NR-RLC, NR-MAC, and NR PHY UL layers.

Thus, for such a wireless device, when multi-RAT uplink coexistence in the same carrier is enabled, all uplink data traffic may be transmitted using the NR-PUSCH. Higher layers may be mapped onto the single instance of the NR UL L2 and L1 protocol layers; for example, for control plane communications, LTE RRC and NR RRC may both be mapped to NR PDCP, and for user plane communications, traffic flows may similarly be mapped to NR PDCP. For LTE-NR NSA operation, the normal NR Uu protocol stack may be used for dual connection operation. For NR SA operation, the normal NR Uu protocol stack may also be used.

At least in some instances, a separate PDCP entity in the PDCP sublayer may be established for LTE SRB transmission for UL coexistence operation. This PDCP entity may carry data of the LTE SRB, and together with the associated RLC entity for LTE SRB transmission may be configured by RRC when the eNB decides to initiate the UL coexistence operation. The eNB may be able to configure the UE to enable the UL coexistence functionality based on the UE and eNB configuration, and/or based on the measurement report (s) or network configuration, according to various embodiments.

Figure 11:
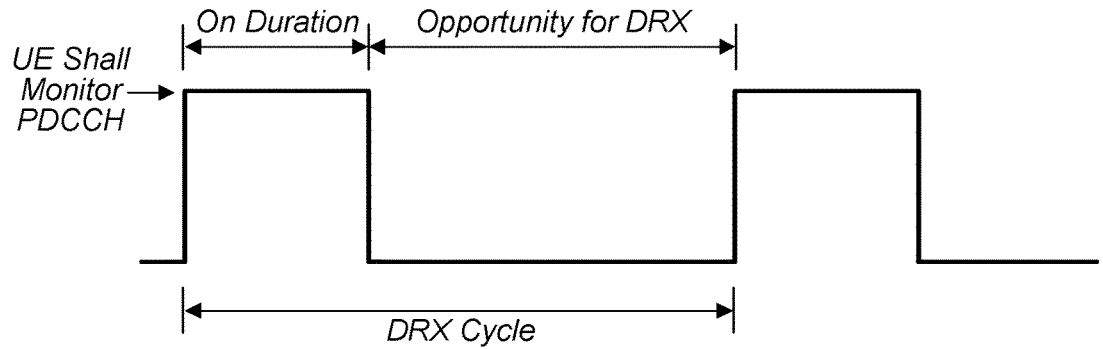
FIGS. 11-12 illustrate possible DRX related considerations when RRC multiplexing is used to support inter-RAT dual uplink connectivity in the same carrier frequency, according to some embodiments.

FIG. 11 illustrates a possible DRX configuration according to which a UE may be configured for a RAT. According to some embodiments, discontinuous reception (DRX) operations as defined in LTE and NR respectively may be kept the same when utilizing RRC or MAC multiplexing, e.g., with the DRX parameters configured by the RRC. The MAC entity may be configured by RRC with a DRX functionality that controls the UE's PDCCH monitoring. In NSA UL coexistence case, it may be the case that the DRX configurations for LTE and NR may not be the same.

Figure 12:
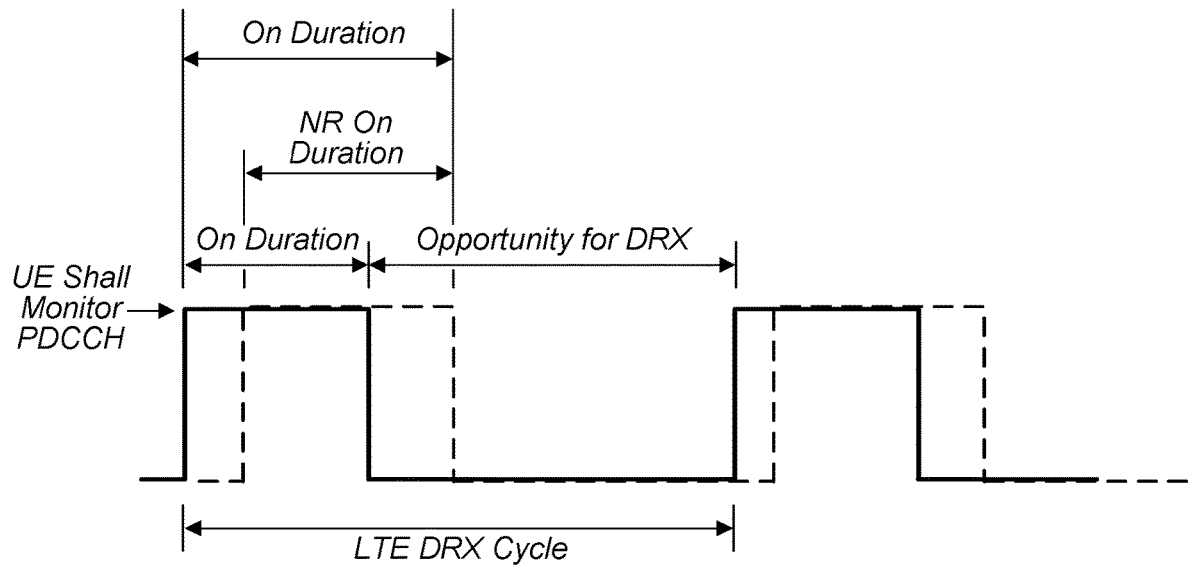

As one possibility for determining the DRX parameters for the DRX operations, the UE may receive separate DRX configuration from the LTE RRC and the NR RRC respectively, and may internally harmonise the DRX configurations. The UE may use the related timers to determine the maximum needed on duration period such that the PDCCH from both LTE and NR may not be missed by the UE. FIG. 12 illustrates one possible manner in which two DRX configurations might be harmonized such that the on duration period encompases the on durations for both DRX configurations.

As another possibility, the secondary node (e.g., either eNB or gNB, depending on the network configuration options) may send the DRX configurations for the secondary node to the master node, which may perform the harmonization and send a single harmonized DRX configuration to each UE via RRC. In this case, the UE may be able to simply use the indicated DRX configuration.

Figure 13:
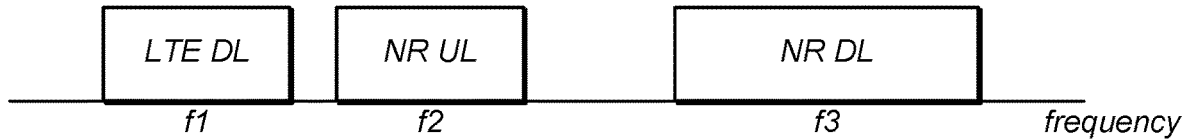
FIG. 13 illustrates an example possible different system bandwidths for LTE and NR, according to some embodiments.

According to some embodiments, LTE carrier aggregation (CA) techniques may support a single UL component carrier (CC) for multiplexing UL physical control/data channels and multiple DL CCs for increased DL reception rates. In a MAC multiplexing solution for inter-RAT uplink connectivity using the same frequency carrier, there may (at least in some instances) effectively be two DL carriers (e.g., one for LTE and the other for NR) and one UL carrier (e.g., in NR). Thus, such a MAC multiplexing solution may resemble at least some CA scenarios, and at least in some instances, a similar approach may be used, e.g., for cross RAT scheduling. FIG. 13 illustrates such a scenario, e.g., in which an LTE DL carrier is deployed on a first carrier frequency, a NR UL carrier is deployed on a second carrier frequency, and a NR DL carrier is deployed on a third carrier frequency. Note that such an approach may be facilitated by an ideal backhaul connection between the eNB and gNB (e.g., assuming co-located eNB and gNB), at least in some instances. As NR may be generally more flexible than LTE, at least in some instances, NR may be able to accommodate LTE.

Figure 14:
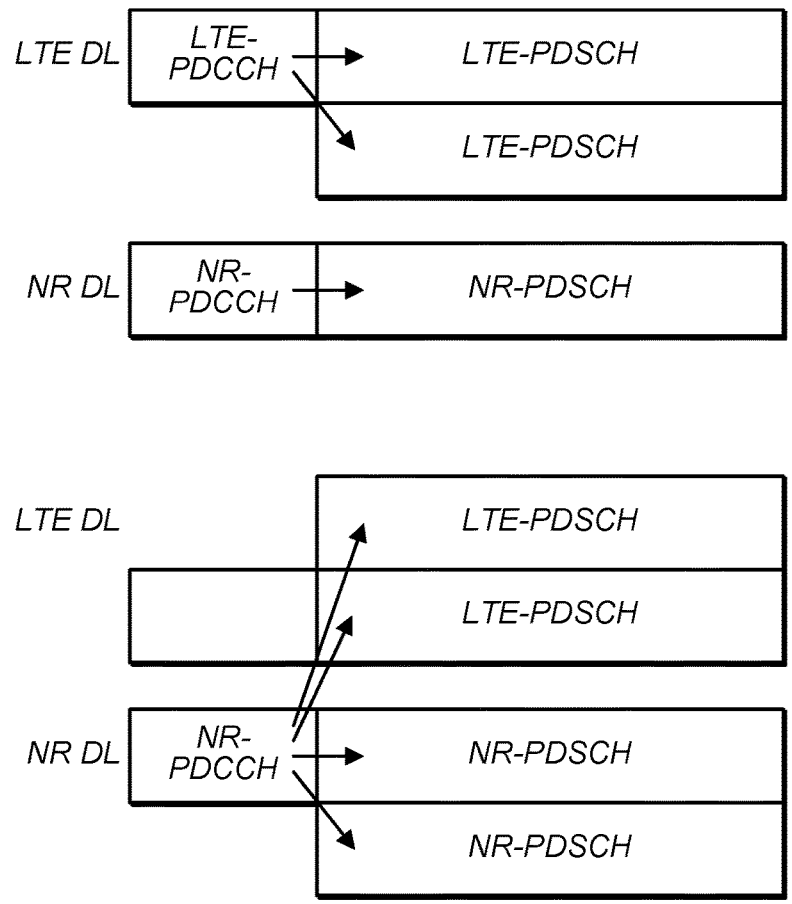
FIG. 14 illustrates examples of possible downlink scheduling arrangements, according to some embodiments.

FIG. 14 illustrates possible downlink scheduling approaches that may be used in conjunction with a CA-like approach to inter-RAT dual connectivity. According to some embodiments, independent scheduling inside each RAT, for both self-carrier scheduling and cross carrier scheduling, may be supported, such as illustrated in the upper portion of FIG. 14. For example, the eNB may schedule the LTE-PDSCH using the LTE-PDCCH, and the gNB may schedule the NR-PDSCH using the NR-PDCCH, such that the eNB and gNB may make independent scheduling choices inside each RAT. Additionally or alternatively, cross RAT scheduling, e.g., for load balancing, may be supported, such as illustrated in the lower portion of FIG. 14. For example, the NR-PDCCH may be used to schedule both the LTE-PDSCH and NR-PDSCH. In this case, a carrier indicator field (CIF) may be added in the beginning of the NR-PDCCH, or a RAT ID+CIF may be added in the beginning of the NR-PDCCH, e.g., to help identify the RAT/carrier being scheduled. Additionally, RA information in LTE-DCI may be translated to RA information in NR.

For acknowledged mode communication, a UE may be expected to respond to downlink communications on LTE and NR carriers by providing acknowledgements (ACKs)/ negative acknowledgements (NACKs), e.g., as appropriate based on the UE's success or lack thereof receiving and decoding those communications. Accordingly, in a MAC multiplexing approach to inter-RAT dual connectivity using the same carrier frequency, LTE-ACK/NACKs and NR-ACK/NACKs may be multiplexed. According to various embodiments, the LTE-ACK/NACKs and NR-ACK/ NACKs may be transmitted using the same physical channel (e.g., NR-PUCCH) or transmitted through different physical channels (e.g., NR-PUCCH for NR-ACK/NACKs, NR-PUSCH for LTE-ACK/NACKs). If the LTE-ACK/NACKs and NR-ACK/NACKs are both transmitted using the NR-PUCCH, a NR-PUCCH format that supports LTE ACK/ NACKs may be used.

For a RRC multiplexing approach to inter-RAT dual connectivity using the same carrier frequency, LTE-ACK/ NACKs and NR-ACK/NACKs may also be multiplexed on the NR-PUCCH. For example, a NR-PUCCH format may be designed to transmit multiplexed LTE-ACK/NACK and NR-ACK/NACKs, a PUCCH format may be designed to transmit the LTE ACK/NACK, and/or a field may be reserved in the NR-PUCCH to transfer the LTE ACK/ NACK. As another possibility, the LTE ACK/NACK may be transmitted in the NR-PUSCH.

Figure 15:
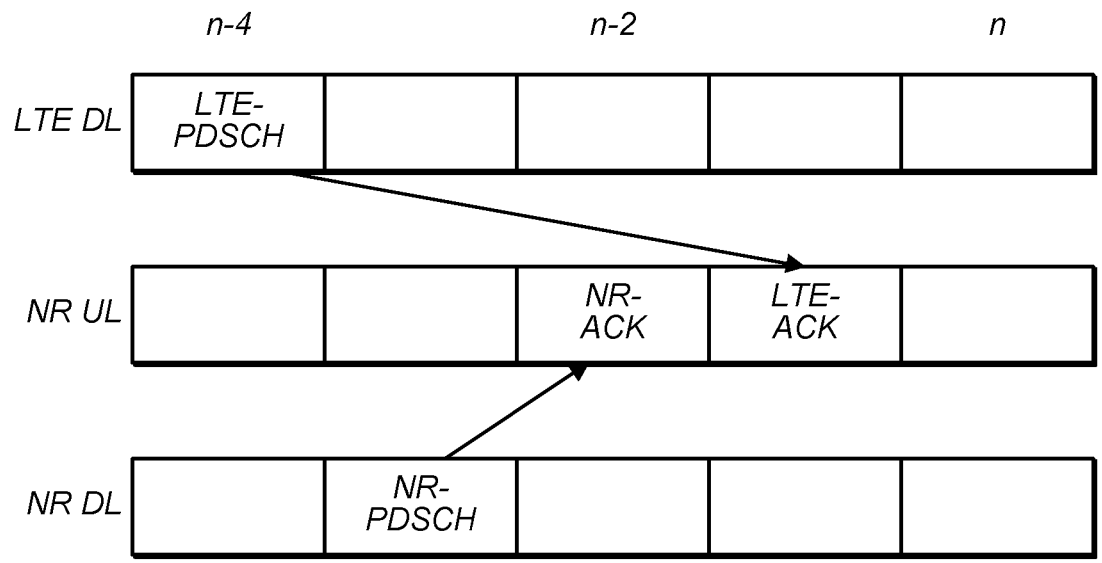
FIGS. 15-18 illustrate examples of possible uplink scheduling arrangements when MAC multiplexing is used to support inter-RAT dual uplink connectivity in the same carrier frequency, according to some embodiments.
Figure 16:
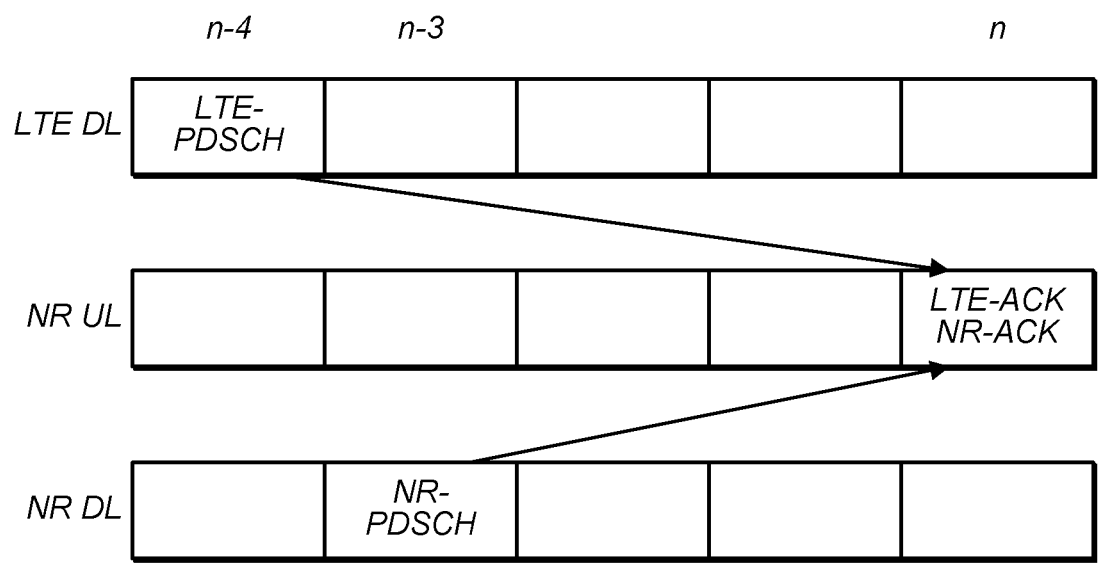

As may be typical in LTE, a 4 ms gap between LTE-PDSCH data being transmitted and a LTE-ACK response for hybrid automatic repeat request (HARQ) ACKs may be used in either of a MAC or RRC multiplexing approach to inter-RAT dual connectivity using the same carrier frequency, at least according to some embodiments. Alternatively, since the LTE-ACK may be received by a gNB and delivered to the eNB through an $X_2$ interface, it may be possible to use a more flexible timing (e.g., may not need to be 4 ms) between reception of the LTE-PDSCH data and transmission of the LTE-ACK on the air interface. Further, since the LTE-ACK may have to be sent to the eNB through the gNB, it may be preferable for the gNB to receive the LTE-ACK less than 4 ms after the LTE-PDSCH data is received. Thus, as one possibility, the LTE-PDSCH to LTE-ACK timing in NR-UL could be any fixed number less than or equal to 4 ms. Note that the eNB and the gNB may need to know the mapping between the LTE-PDSCH and the corresponding ACK. Flexible timing for NR-ACK/NACKs relative to the NR-PDSCH may be supported (e.g., through NR-downlink control information). The mapping from ACK/NACK bits to RAT (LTE/NR) may be semi-statically configured, e.g., to facilitate distinguishing LTE-ACKs from NR-ACKs. FIGS. 15-16 illustrate examples of such possible ACK timing when MAC or RRC multiplexing is used to support inter-RAT dual uplink connectivity in the same carrier frequency. As shown, in FIG. 15, an NR-ACK and an LTE-ACK may be transmitted in different slots on the NR UL carrier, while in FIG. 16, an NR-ACK and an LTE-ACK may be transmitted in the same slot on the NR UL carrier.

In some instances, LTE ACK/NACKs and NR ACK/NACKs may be multiplexed on NR physical layer channels as needed. For example, if NR PUSCH is not available, an LTE ACK/NACK may be multiplexed with an NR ACK/NACK and transmitted on the NR PUCCH channel. In this case, a NR PUCCH format similar to LTE PUCCH type 3 may be defined, at least in some instances, such that ACK/NACKs from LTE can be received by the gNB as from other NR carriers. As another possibility a field in the NR PUCCH format may be reserved for transmitting a LTE ACK/NACK payload. Alternatively, if NR PUSCH is available, the LTE ACK/NACK and NR ACK/NACK may be multiplexed with the MAC payload and transmitted on the NR PUSCH channel.

Figure 17:
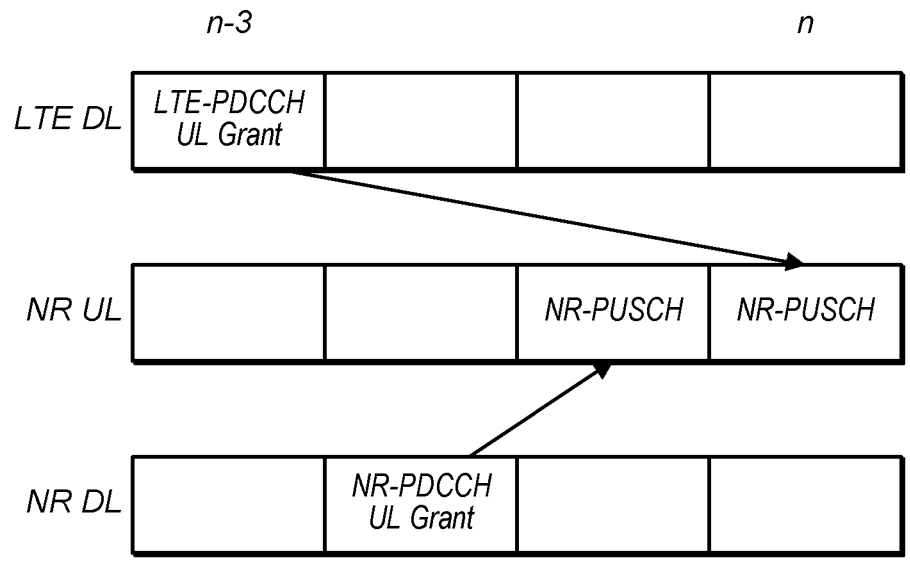
Figure 18:
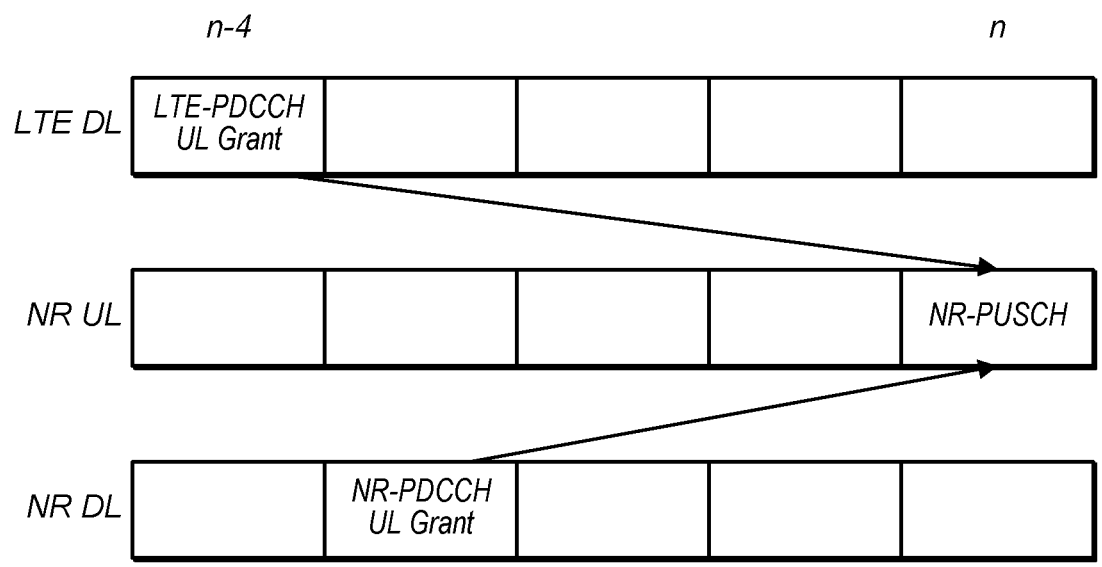

FIGS. 17-18 illustrate possible arrangements for scheduling a NR-PUSCH when using a MAC/RRC multiplexing approach to inter-RAT dual connectivity using the same carrier frequency, according to some embodiments. As shown in FIG. 17, an eNB may schedule a UE to use the NR-PUSCH (e.g., for aperiodic CS report requests, RRC signaling, etc.) using the LTE-PDCCH, while a gNB may schedule the UE to use the NR-PUSCH (e.g., for UL data) using the NR-PDCCH, in different slots. Note that while in LTE the timing between a UL grant and PUSCH transmission may typically be fixed as 4 ms. However, different timing may be used if desired in a MAC/RRC multiplexing scenario. For example, the time duration could be any fixed number less than or equal to 4 ms (e.g, 3 ms in the example scenario illustrated in FIG. 17). Note that the eNB and gNB may need to know the mapping between the LTE-PDCCH and the corresponding NR-PUSCH. As shown in FIG. 18, NR-PUSCH multiplexing may also be supported, such that NR-PUSCH communications scheduled by an eNB using the LTE-PDCCH and NR-PUSCH communications scheduled by a gNB using the NR-PDCCH may occur in the same slot. As one such possibility, data from LTE and NR may be multiplexed in a single PUSCH. As another possibility, data from LTE and data from NR may be sent by separate PUSCH channels in the same slot.

Figure 19:
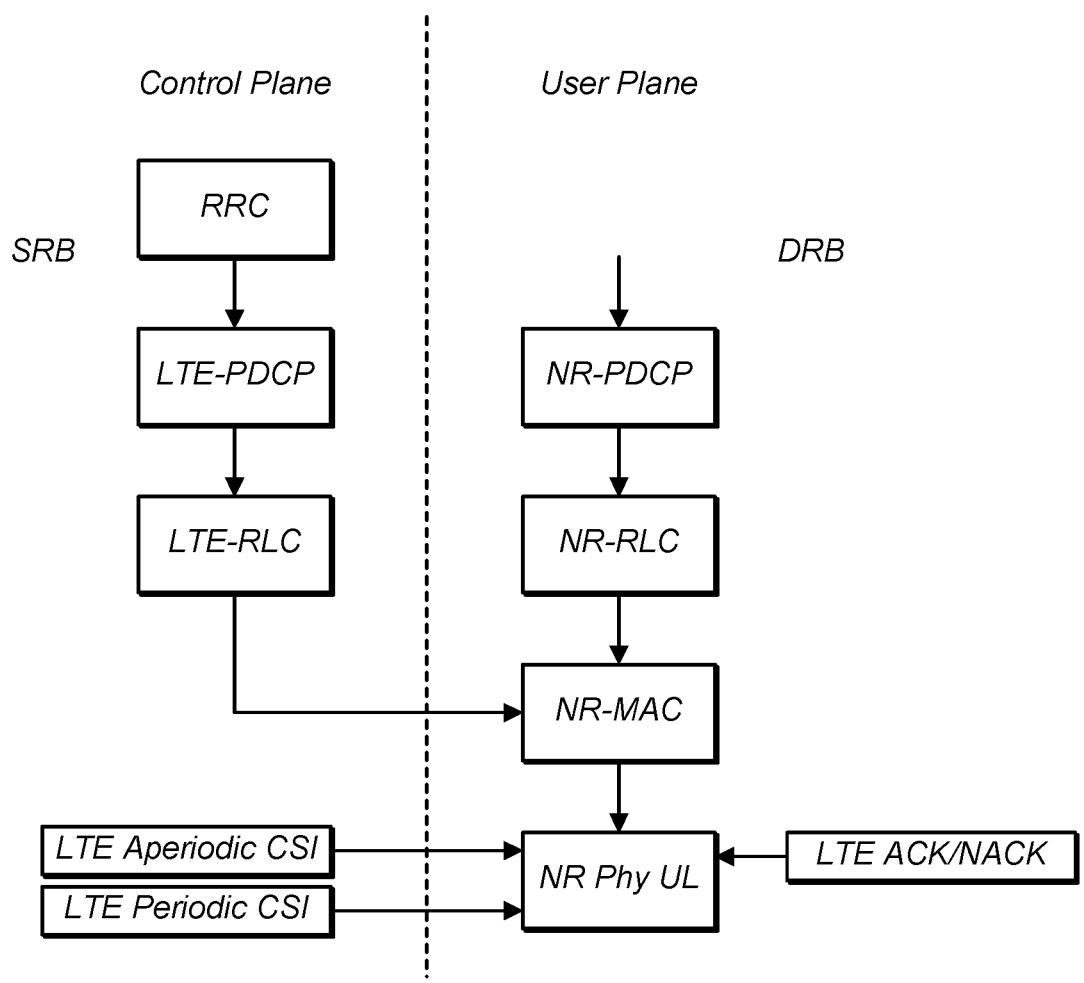
FIG. 19 illustrates an example of possible protocol stacks for a wireless device that implements MAC multiplexing to support inter-RAT dual uplink connectivity in the same carrier frequency, including CSI and ACK/NACK considerations, according to some embodiments.

In addition to higher layer control signaling that may be multiplexed with NR data at the NR MAC layer when using a MAC multiplexing approach to inter-RAT dual connectivity using the same carrier frequency, LTE UL physical layer control signals (e.g., to support LTE DL operations) may also be sent through NR UL using a NR waveform, according to some embodiments. FIG. 19 illustrates an example of possible protocol stacks for a wireless device that implements MAC multiplexing to support inter-RAT dual uplink connectivity in the same carrier frequency, e.g., similar to FIG. 9, but additionally illustrating LTE physical layer control signaling considerations, such as LTE aperiodic CSI, LTE periodic CSI, and LTE ACK/NAC. Note that in a MAC multiplexing scenario, as the LTE uplink control information may be received by the gNB and forwarded to the eNB, if the LTE eNB schedules PUCCH (uplink control information) for a certain time, the LTE-PUCCH may be transmitted by the UE and received by the gNB earlier than the specified time, e.g., to facilitate its timely delivery.

As one possibility, LTE uplink control information (e.g., ACK, scheduling request, channel quality information, pre-coding matrix indicator, rank indicator, etc.) may be sent through the NR-PUSCH. NR uplink control information may be sent through the NR-PUCCH and/or the NR-PUSCH. In this example, LTE DL aperiodic CQI report requests may be treated as implicit NR UL PUSCH grants. LTE data transmission that triggers the joint transmission of LTE-ACK and CSI could also be considered as implicit NR UL PUSCH grants in this case. A UE may support simultaneous transmission of NR-PUCCH and NR-PUSCH with the LTE uplink control information, or may piggyback the NR-PUCCH in the NR-PUSCH.

As another possibility, it may be possible to multiplex the LTE uplink control information and the NR uplink control information through a NR-PUCCH (e.g., joint encoding). It may be possible to use a short or long format NR-PUCCH to multiplex the uplink control information. For example, a short NR-PUCCH may be used for ACK/NACK/SR, or a long NR-PUCCH may be used for ACK/NACK/SR/CQI/PMI/etc. The mapping between uplink control information bits and RAT (LTE/NR) may be determined by RRC signaling or implicit rule, in this case, e.g., to facilitate distinguishing between which uplink control information bits are associated with which RAT.

As a still further possibility, it may be possible to assign two separate NR-PUCCHs (e.g., separate encoding); one for LTE uplink control information and the other for NR uplink control information. In this case, the two NR-PUCCHs could be multiplexed in the same time-frequency resource using different sequences/codes, or could be sent in non-overlapping/different time-frequency resources.

As a yet further possibility, it may be possible to assign two separate PUCCHs (e.g., separate encoding) according to different RATs; a LTE-PUCCH for the LTE uplink control information and a NR-PUCCH for NR uplink control information. Thus, in this case, a frequency division multiplexing approach may be used for this L1 signaling. Sending time critical control information through separate physical layers may facilitate more timely reception by the corresponding NBs. Thus, in such a scenario, only a portion (e.g., data) of LTE signaling may be MAC multiplexed at the NR MAC layer and sent via the NR-PUSCH.

For periodic CSI reporting, in some instances NR and LTE may be configured with different timing, e.g., the eNB and gNB may schedule periodic CSI reports on different occasions. Accordingly, it may be possible for a gNB to identify whether a received CSI report is for NR or LTE based on the received timing of the CSI report, at least according to some embodiments. It may be possible for a UE to use the long NR-PUCCH structure to send the LTE CSI. In this case, the LTE CSI {PMI, RI, CQI, etc.} may be mapped/translated to corresponding NR CSI {PMI, RI, CQI, etc.} for the long NR-PUCCH format. The UE may also use the long NR-PUCCH structure to send NR CSI. The NR PUCCH design may not need to support concurrent LTE and NR periodic CSI reports, nor may multiplexing between LTE periodic CSI reports and NR periodic CSI reports be needed, but coordination between the eNB and gNB may be needed.

In some instances, LTE periodic CSI reports may be multiplexed with NR CSI report payloads and may be transmitted on the NR PUSCH or NR PUCCH channel. In this case, the NR PUCCH may be designed to support concurrent LTE periodic CSI and NR periodic CSI payloads.

This may not require any scheduling changes for LTE or impact LTE baseband operations.

For aperiodic CSI reporting, a LTE eNB may send aperiodic CSI reporting requests in LTE DL, based on which a UE may provide the aperiodic LTE-CSI report though the NR-UL. A NR gNB may send aperiodic CSI reporting requests in NR DL, based on which a UE may provide the aperiodic NR-CSI report also though the NR-UL. In case there is a collision between aperiodic CSI and periodic CSI, one could be granted a higher priority than the other. Dropping of the lower priority CSI report may occur, and only the CSI report with the higher priority may be sent. For example, as one possibility in such a conflict, a LTE periodic CSI report may be dropped (which may be decided in LTE PHY) and a LTE aperiodic CSI report payload may be passed to NR PHY.

In some instances, LTE aperiodic CSI reports may be multiplexed with NR control payloads. For example, if NR PUSCH is available when a LTE aperiodic CSI report is scheduled, the LTE aperiodic CSI report may be multiplexed with the NR MAC payload and transmitted on the NR PUSCH channel. If NR PUSCH is not available when a LTE aperiodic CSI report is scheduled, the LTE aperiodic CSI report may be multiplexed with the NR control payload and transmitted on the NR PUCCH channel. For this option, the NR PUCCH design may need to be able to support concurrent LTE aperiodic CSI and NR control payload, but may be associated with minimal changes to LTE.

In some instances, the eNB aperiodic CSI request timing may be coordinated, such that the eNB only requests aperiodic CSI reports to be sent on UL subframes with NR PUSCH grants, and each LTE aperiodic CSI report may be multiplexed with the NR MAC payload and transmitted on the NR PUSCH channel. In this case, the NR PUCCH design may not need to support LTE aperiodic CSI reports, but may need coordination between eNB and gNB on LTE aperiodic CSI request timing.

In some instances, an LTE PUSCH grant allocation for a LTE aperiodic CSI request may be provided, such that a UE may transmit the LTE aperiodic CSI report using an LTE waveform on the NR UL system bandwidth, e.g., as a frequency division multiplexing exception to the MAC multiplexing approach to supporting inter-RAT dual connectivity using the same carrier frequency. This option may need coordination between the eNB and the gNB to avoid UL grant allocation conflict, and further the gNB may need to be able to decode the LTE PUSCH.

In some instances, LTE downlink signaling messages (such as RRC, NAS) and downlink data traffic can still be transmitted on a downlink LTE carrier, and may be received independently and in parallel with NR downlink signaling messages (similarly such as RRC, NAS) and downlink data traffic on a downlink NR carrier by a UE. In such a case, for LTE SRBs and DRBs with RLC AM, the RLC status report (RLC ACK/NACK) for LTE DL SRB and DRB may be generated in LTE RLC, but may be transmitted on the NR UL carrier by UE NR MAC and NR L1 as NR RLC status reports for the LTE DL SRBs and DRBs, along with NR RLC status reports for NR DL SRBs and DRBs. The gNB could then pass the received RLC status reports for LTE DL SRBs and DRBs to the eNB for further processing.

The following description provides an example of how data processing flow between a UE, a eNB, and a gNB could proceed when using a RRC multiplexing approach to inter-RAT uplink coexistence in the same frequency band.

An X interface between gNB and eNB can be a physical link if the gNB and the eNB are separated, or a logical link if they co-exist in one system.

In this example, there may be a SRB 1 and DRB 4 on eNB for LTE; correspondingly, the gNB may also establish LTE-SRB 1 and LTE-DRB 4 which are the mapping RBs for eNB SRB 1 and DRB 4; in the mean time, gNB can still have NR SRB 1 and NR DRB4.

In the DL direction, 1) eNB sends DL LTE RRC message on eNB SRB1, and DL LTE data on eNB DRB4; on LTE DL carrier, 2) UE receives LTE RRC message on SRB 1 and processed by LTE RRC, and LTE data on DRB4 and processed by LTE PDCP; 3) since SRB1 and DRB 4 are in RLC AM mode, UE LTE RLC layer generates RLC status PDU (RLC ACK/NACK) for LTE SRB1, and RLC status PDU for LTE DRB4; these RLC status PDUs are forwarded to UE NR protocol stack on NR's LTE-SRB1 and NR's LTE-DRB4, and then transmitted by UE NR MAC and L1 on UL shared LTE/NR carrier. 4) gNB then receives the RLC status PDUs on NR's LTE-SRB1 and LTE-DRB4, and passes the RLC status PDUs to eNB's SRB1 and DRB4 through the X interface between gNB and eNB; 5) eNB's RLC layer on SRB1 and DRB4 processes the RLC status PDU and acknowledges the DL LTE RRC message and DL LTE data are successfully transmitted.

In the UL direction, 1) UE sends UL LTE RRC message on NR's LTE-SRB1 and UL data on NR's LTE-DRB4 or NR's NR DRB4; NR MAC transmits data from NR's LTE-SRB1, NR's LTE-DRB4, NR's SRB1, NR's DRB4 on UL LTE/NR shared carrier; 2) gNB receives the UL LTE RRC message and UL LTE data on NR's LTE-SRB1 and NR's LTE-DRB4, and generates RLC status PDUs on NR's LTE-SRB1 and NR's LTE-DRB4, these RLC status PDUs are then transmitted by gNB's NR MAC and L1 on DL NR carrier. 3) UE receives the RLC status PDUs on NR's LTE-SRB1 and NR's LTE-DRB4 on DL DR carrier, and UE's NR RLC layer acknowledges the UL LTE RRC message on NR's LTE-SRB 1 and UL LTE data on NR's LTE-DBR4.

In summary, on UE side UL, the UE NR's LTE-SRB1 and LTE-DRB4 transmit RLC status PDUs for eNB LTE DL SRB1 and DL DRB4, and LTE UL RRC messages and LTE UL data; on UE side DL, the UE LTE's SRB1 and DRB4 receives eNB LTE DL RRC messages and eNB LTE DL data; on gNB side UL, the gNB NR's LTE-SRB1 and LTE-DRB4 receives UE LTE UL RRC messages and UE LTE UL data, and also RLC status PDUs for eNB LTE DL SRB1 and DL DRB4; on gNB side DL, the gNB NR's LTE-SRB1 and LTE-DRB4 transmit RLC status PDUs for UE UL RRC messages and UE LTE UL data; on eNB side UL, the eNB receives nothing; and on eNB side DL, the eNB transmits LTE DL RRC messages on LTE SRB1 and LTE DL data on LTE DRB4.

In the following further exemplary embodiments are provided.

One set of embodiments may include a method, comprising: by a wireless device: establishing a first wireless link with a first base station according to a first radio access technology (RAT), wherein the first base station provides a first cell operating in a first system bandwidth; establishing a second wireless link with a second base station according to a second radio access technology (RAT), wherein the second base station provides a second cell operating in a second system bandwidth; determining whether the wireless device has uplink activity scheduled according to both the first RAT and the second RAT; and performing uplink activity for both the first RAT and the second RAT in the first system bandwidth by multiplexing uplink data for the first RAT and uplink data for the second RAT at a media access control (MAC) layer of the first RAT if uplink activity is scheduled according to both the first RAT and the second RAT.

According to some embodiments, performing uplink activity for both the first RAT and the second RAT in the first system bandwidth by multiplexing uplink data for the first RAT and uplink data for the second RAT at a media access control (MAC) layer of the first RAT further comprises: providing the uplink data for the second RAT from a radio link control (RLC) layer of the second RAT to the MAC layer of the first RAT; and generating and transmitting uplink signals comprising the multiplexed uplink data for the first RAT and uplink data for the second RAT using first RAT circuitry.

According to some embodiments, the method further comprises: providing a mapping mechanism for indicating that the uplink data for the first RAT is associated with the first RAT and for indicating that the uplink data for the second RAT is associated with the second RAT after the uplink data for the first RAT and the uplink data for the second RAT are multiplexed at the MAC layer of the first RAT.

According to some embodiments, the method further comprises equally prioritizing logical channels for the first RAT and the second RAT that have equal priority at the MAC layer of the first RAT.

According to some embodiments, the method further comprises: prioritizing logical channels for the first RAT more highly than logical channels for the second RAT that have equal priority at the MAC layer of the first RAT.

According to some embodiments, performing uplink activity for both the first RAT and the second RAT in the first system bandwidth further comprises: transmitting the multiplexed uplink data for the first RAT and the second RAT using a physical layer waveform in accordance with the first RAT.

According to some embodiments, the method further comprises: receiving downlink control information at a physical layer of the second RAT that triggers transmission of uplink control information according to the second RAT; and providing the uplink control information from the physical layer of the second RAT to a physical layer of the first RAT, wherein the uplink control information from the physical layer of the second RAT is transmitted using a waveform according to the first RAT.

According to some embodiments, the uplink control information from the physical layer of the second RAT is transmitted using one of: a physical layer data channel according to the first RAT; or a physical layer control channel according to the first RAT.

According to some embodiments, the method further comprises: receiving an uplink scheduling grant for a first subframe for the first RAT; receiving an uplink scheduling grant for the first subframe for the second RAT; and determining that the wireless device has uplink activity scheduled according to both the first RAT and the second RAT based on receiving the uplink scheduling grant for the first subframe for the first RAT and receiving the uplink scheduling grant for the first subframe for the second RAT.

According to some embodiments, the method further comprises: performing uplink activity for the first RAT in the first system bandwidth if uplink activity is scheduled according to only the first RAT; and performing uplink activity for the second RAT in the second system bandwidth if uplink activity is scheduled according to only the second RAT.

According to some embodiments, the method further comprises: receiving discontinuous reception (DRX) configuration information according to each of the first RAT and the second RAT; and determining a DRX configuration for the wireless device based at least in part on the DRX configuration information according to each of the first RAT and the second RAT, wherein according to the determined DRX configuration the wireless device wakes for on-duration periods for both the first RAT and the second RAT.

According to some embodiments, the method further comprises: receiving discontinuous reception (DRX) configuration information according to one of the first RAT or the second RAT, wherein the DRX configuration information configures the wireless device for DRX operation according to both the first RAT and the second RAT.

According to some embodiments, the first RAT comprises 5G NR, and the second RAT comprises LTE.

Another set of embodiments may include a method, comprising: by a wireless device: establishing a first wireless link with a first cell according to a first radio access technology (RAT), wherein the first cell operates in a first system bandwidth; establishing a second wireless link with a second cell according to a second radio access technology (RAT), wherein the second cell operates in a second system bandwidth; determining whether inter-RAT uplink coexistence in the same frequency band is enabled; and performing uplink activity for both the first RAT and the second RAT in the first system bandwidth by multiplexing uplink data for the first RAT and uplink data for the second RAT at a packet data convergence protocol (PDCP) layer of the first RAT if inter-RAT uplink coexistence in the same frequency band is enabled.

According to some embodiments, performing uplink activity for both the first RAT and the second RAT in the first system bandwidth by multiplexing uplink data for the first RAT and uplink data for the second RAT at a PDCP layer of the first RAT further comprises: providing the uplink data for the second RAT from a radio resource control (RRC) layer of the second RAT to the PDCP layer of the first RAT; and generating and transmitting uplink signals comprising the multiplexed uplink data for the first RAT and uplink data for the second RAT using first RAT circuitry.

According to some embodiments, performing uplink activity for both the first RAT and the second RAT in the first system bandwidth further comprises: transmitting the multiplexed uplink data for the first RAT and the second RAT using a physical layer waveform in accordance with the first RAT.

According to some embodiments, the method further comprises: receiving downlink control information at a physical layer of the second RAT that triggers transmission of uplink control information for the second RAT; and providing the uplink control information from the physical layer of the second RAT to a physical layer of the first RAT, wherein the uplink control information from the physical layer of the second RAT is transmitted using a waveform according to the first RAT.

According to some embodiments, the uplink control information from the physical layer of the second RAT is transmitted using one of: a physical layer data channel according to the first RAT; or a physical layer control channel according to the first RAT.

According to some embodiments, the method further comprises: receiving downlink control information at a physical layer of the second RAT that triggers transmission of uplink control information for the second RAT; and transmitting the uplink control information for the second RAT according to the second RAT, wherein the uplink control information for the second RAT is transmitted in the first system bandwidth using frequency division multiplexing.

According to some embodiments, the first RAT comprises 5G NR, wherein the second RAT comprises LTE.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a wireless device to:
    establish a first wireless link with a first cell according to a first radio access technology (RAT), wherein the first cell operates in a first system bandwidth, wherein the first RAT is a cellular RAT;
    establish a second wireless link with a second cell according to a second radio access technology (RAT), wherein the second cell operates in a second system bandwidth, wherein the second RAT is a second cellular RAT;
    determine whether inter-RAT uplink coexistence in the same frequency band is enabled; and
    perform uplink activity for both the first RAT and the second RAT in the first system bandwidth by multiplexing uplink data for the first RAT and uplink data for the second RAT at a protocol layer of the first RAT that is higher than the physical layer if inter-RAT uplink coexistence in the same frequency band is enabled.

2. The apparatus of claim 1,
    wherein the protocol layer of the first RAT that is higher than the physical layer comprises a packet data convergence protocol (PDCP) layer of the first RAT.

3. The apparatus of claim 1,
    wherein the protocol layer of the first RAT that is higher than the physical layer comprises a media access control (MAC) layer of the first RAT.

4. The apparatus of claim 1, wherein performing uplink activity for both the first RAT and the second RAT in the first system bandwidth further comprises:
    transmitting the multiplexed uplink data for the first RAT and the second RAT using a physical layer waveform in accordance with the first RAT.

5. The apparatus of claim 1,
    wherein the first RAT comprises 5G NR,
    wherein the second RAT comprises LTE.

6. A method, comprising:
    by a wireless device:
    establishing a first wireless link with a first cell according to a first radio access technology (RAT), wherein the first cell operates in a first system bandwidth, wherein the first RAT is a cellular RAT;
    establishing a second wireless link with a second cell according to a second radio access technology (RAT), wherein the second cell operates in a second system bandwidth, wherein the second RAT is a second cellular RAT;
    determining whether inter-RAT uplink coexistence in the same frequency band is enabled; and
    performing uplink activity for both the first RAT and the second RAT in the first system bandwidth by multiplexing uplink data for the first RAT and uplink data for the second RAT at a packet data convergence protocol (PDCP) layer of the first RAT if inter-RAT uplink coexistence in the same frequency band is enabled.

7. The method of claim 6, wherein performing uplink activity for both the first RAT and the second RAT in the first system bandwidth by multiplexing uplink data for the first RAT and uplink data for the second RAT at a PDCP layer of the first RAT further comprises:
    providing the uplink data for the second RAT from a radio resource control (RRC) layer of the second RAT to the PDCP layer of the first RAT; and
    generating and transmitting uplink signals comprising the multiplexed uplink data for the first RAT and uplink data for the second RAT using first RAT circuitry.

8. The method any claim 6, further comprising:
    receiving downlink control information at a physical layer of the second RAT that triggers transmission of uplink control information for the second RAT; and
    providing the uplink control information from the physical layer of the second RAT to a physical layer of the first RAT,
    wherein the uplink control information from the physical layer of the second RAT is transmitted using a waveform according to the first RAT.

9. The method of claim 8,
wherein the uplink control information from the physical layer of the second RAT is transmitted using one of:
a physical layer data channel according to the first RAT; or
a physical layer control channel according to the first RAT.

10. The method of claim 6, further comprising:
receiving downlink control information at a physical layer of the second RAT that triggers transmission of uplink control information for the second RAT; and
transmitting the uplink control information for the second RAT according to the second RAT, wherein the uplink control information for the second RAT is transmitted in the first system bandwidth using frequency division multiplexing.

11. A wireless device, comprising:
an antenna;
a radio coupled to the antenna; and
a processing element coupled to the radio;
wherein the wireless device is configured to:
   establish a first wireless link with a first cell according to a first radio access technology (RAT), wherein the first cell operates in a first system bandwidth;
   establish a second wireless link with a second cell according to a second radio access technology (RAT), wherein the second cell operates in a second system bandwidth;
   determine whether the wireless device has uplink activity scheduled according to both the first RAT and the second RAT; and
   perform uplink activity for both the first RAT and the second RAT in the first system bandwidth by multiplexing uplink data for the first RAT and uplink data for the second RAT at a media access control (MAC) layer of the first RAT if uplink activity is scheduled according to both the first RAT and the second RAT.

12. The wireless device of claim 11, wherein to perform uplink activity for both the first RAT and the second RAT in the first system bandwidth by multiplexing uplink data for the first RAT and uplink data for the second RAT at a media access control (MAC) layer of the first RAT, the wireless device is further configured to:
   provide the uplink data for the second RAT from a radio link control (RLC) layer of the second RAT to the MAC layer of the first RAT; and
   generate and transmit uplink signals comprising the multiplexed uplink data for the first RAT and uplink data for the second RAT using first RAT circuitry.

13. The wireless device of claim 11, wherein the wireless device is further configured to:
   provide a mapping mechanism for indicating that the uplink data for the first RAT is associated with the first RAT and for indicating that the uplink data for the second RAT is associated with the second RAT after the uplink data for the first RAT and the uplink data for the second RAT are multiplexed at the MAC layer of the first RAT.

14. The wireless device of claim 11, wherein the wireless device is further configured to:
   equally prioritize logical channels for the first RAT and the second RAT that have equal priority at the MAC layer of the first RAT.

15. The wireless device of claim 11, wherein the wireless device is further configured to:
   prioritize logical channels for the first RAT more highly than logical channels for the second RAT that have equal priority at the MAC layer of the first RAT.

16. The wireless device of claim 11, wherein the wireless device is further configured to:
   receive downlink control information at a physical layer of the second RAT that triggers transmission of uplink control information for the second RAT; and
   transmit the uplink control information for the second RAT according to the second RAT, wherein the uplink control information for the second RAT is transmitted in the first system bandwidth using frequency division multiplexing.

17. The wireless device of claim 11, wherein the wireless device is further configured to:
   receive an uplink scheduling grant for a first subframe for the first RAT;
   receive an uplink scheduling grant for the first subframe for the second RAT; and
   determine that the wireless device has uplink activity scheduled according to both the first RAT and the second RAT based on receiving the uplink scheduling grant for the first subframe for the first RAT and receiving the uplink scheduling grant for the first subframe for the second RAT.

18. The wireless device of claim 11, wherein the wireless device is further configured to:
   perform uplink activity for the first RAT in the first system bandwidth if uplink activity is scheduled according to only the first RAT; and
   perform uplink activity for the second RAT in the second system bandwidth if uplink activity is scheduled according to only the second RAT.

19. The wireless device of claim 11, wherein the wireless device is further configured to:
   receive discontinuous reception (DRX) configuration information according to each of the first RAT and the second RAT; and
   determine a DRX configuration for the wireless device based at least in part on the DRX configuration information according to each of the first RAT and the second RAT, wherein according to the determined DRX configuration the wireless device wakes for on-duration periods for both the first RAT and the second RAT.

20. The wireless device of claim 11, wherein the wireless device is further configured to:
   receive discontinuous reception (DRX) configuration information according to one of the first RAT or the second RAT, wherein the DRX configuration information configures the wireless device for DRX operation according to both the first RAT and the second.

* * * * *